United States Patent [19]
Bar-David et al.

[11] Patent Number: 5,623,511
[45] Date of Patent: Apr. 22, 1997

[54] SPREAD SPECTRUM CODE PULSE POSITION MODULATED RECEIVER HAVING DELAY SPREAD COMPENSATION

[75] Inventors: Israel Bar-David, Haifa, Israel; Rajeev Krishnamoorthy, Rotterdam, Netherlands

[73] Assignee: Lucent Technologies Inc., Murray Hill, N.J.

[21] Appl. No.: 345,110

[22] Filed: Nov. 28, 1994

Related U.S. Application Data

[63] Continuation-in-part of Ser. No. 298,260, Aug. 30, 1994.
[51] Int. Cl.[6] .................................... H04K 1/00
[52] U.S. Cl. .............. 375/207; 375/200; 375/239; 375/343; 370/213
[58] Field of Search .................. 375/207, 200, 375/239, 343; 380/34; 370/10; 332/112

[56] References Cited

U.S. PATENT DOCUMENTS

| | | | |
|---|---|---|---|
| 5,166,952 | 11/1992 | Omurg et al. | 375/200 |
| 5,446,757 | 8/1995 | Chang | 375/239 |

*Primary Examiner*—Stephen Chin
*Assistant Examiner*—T. Ghebretinsae

[57] ABSTRACT

A spread spectrum code pulse position modulated communication system is disclosed. The communication system includes a spread spectrum code pulse position modulated receiver that compensates for the delay spread of a transmission medium, such as a wireless radio channel of a local area network. Delay spread may cause signal components of one transmitted spread spectrum codeword to spill over into chip positions of adjacent symbols, causing intersymbol interference, or into chip positions on quadrature channels of a given symbol interval, such as in a QPSK implementation, causing interchip interference. The disclosed receiver decodes a transmitted spread spectrum code pulse position modulated signal in the presence of such delay spread, utilizing a tentative symbol estimator to sample the matched filter data. The tentative symbol estimator will assign a weight to each potential symbol value, taking into account the cross-rail or bias influence caused by the residual coupling between the signals on quadrature channels for a given symbol duration. In addition, the disclosed receiver includes a mode sifter which evaluates the weighted values for each symbol estimate and assigns final estimates to each symbol value, taking into account the influence of codewords transmitted during one or more successive symbol intervals on one another.

27 Claims, 17 Drawing Sheets

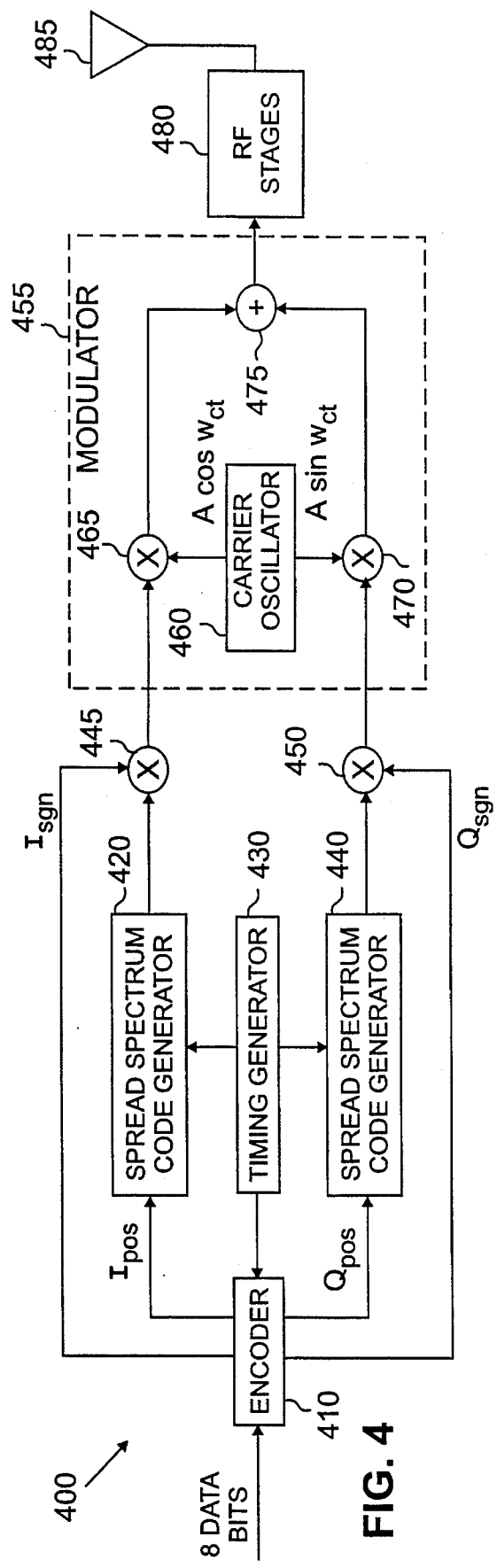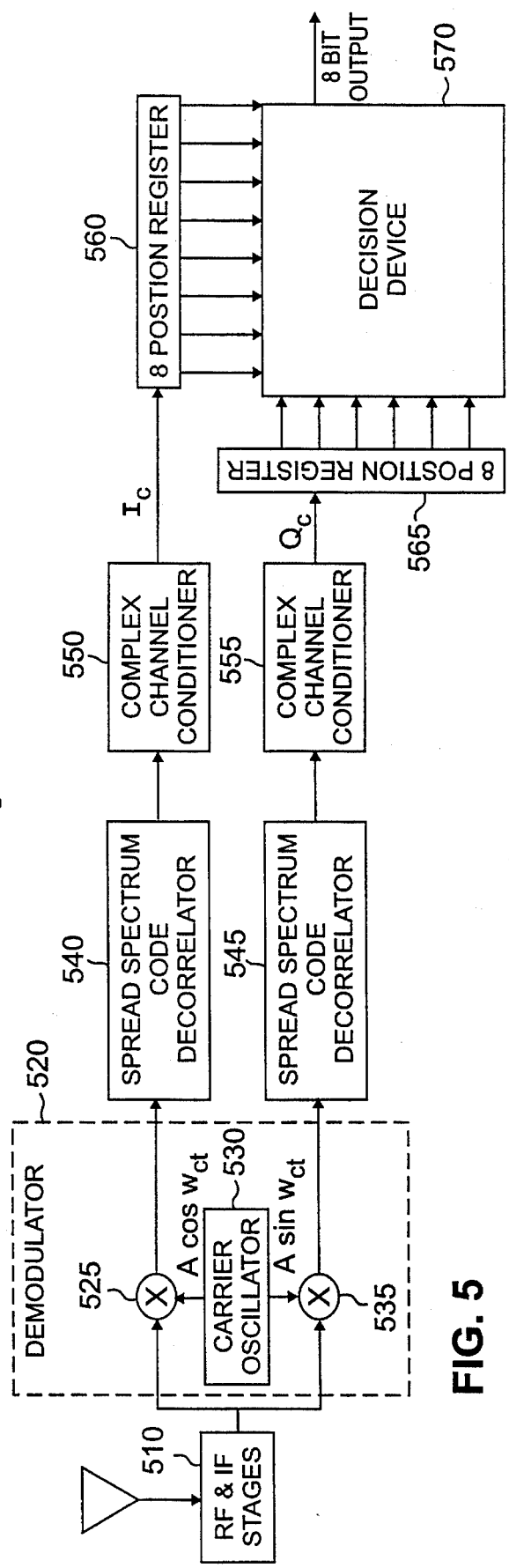
FIG. 4
FIG. 5

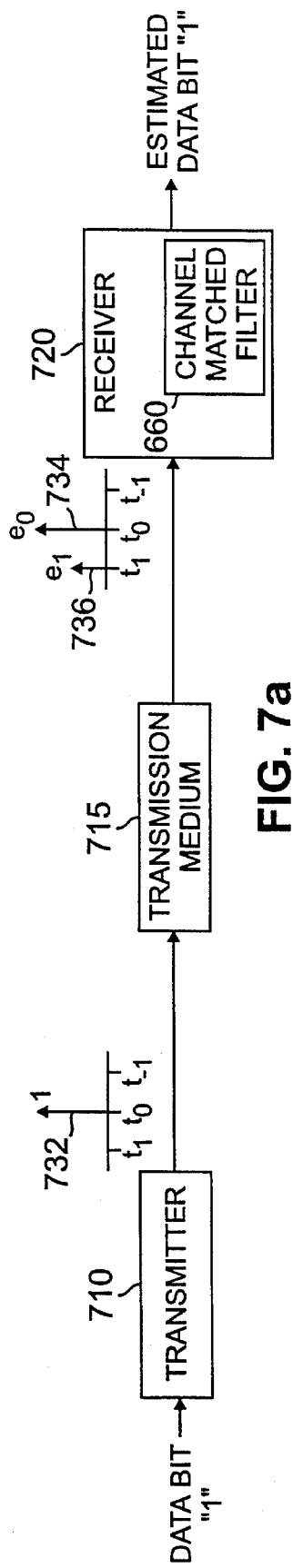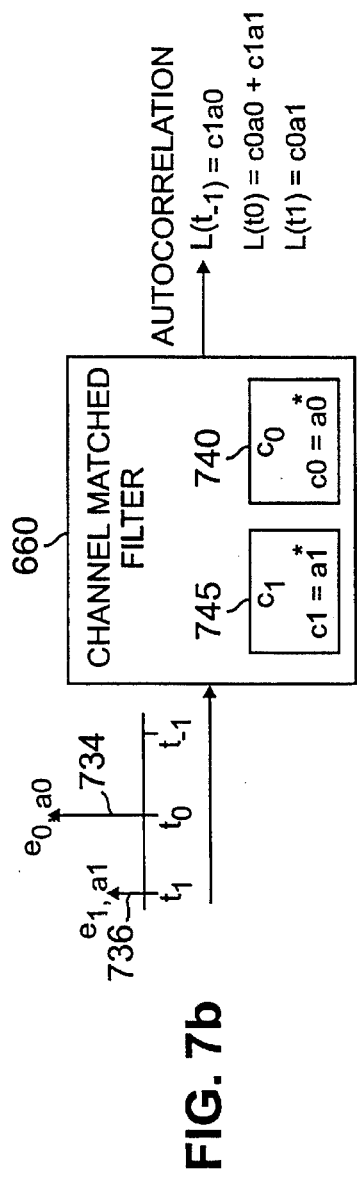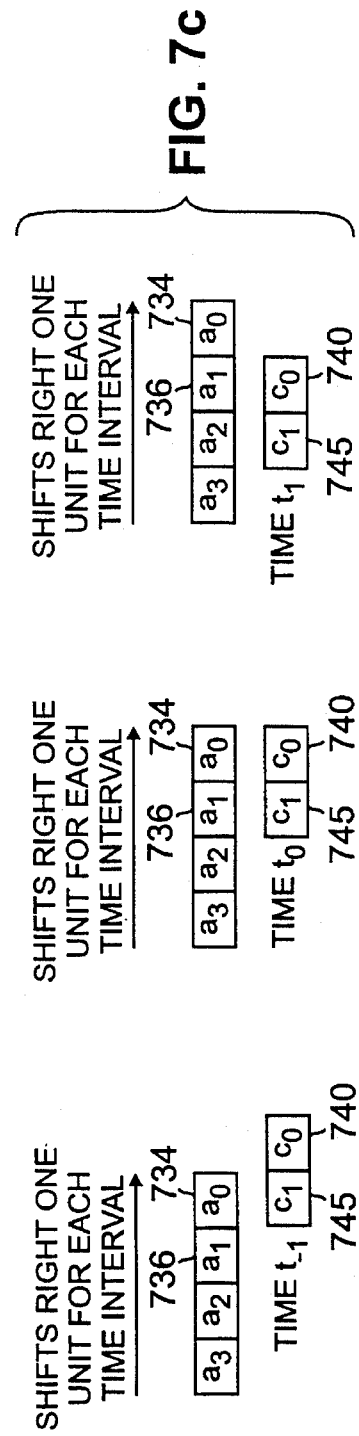
FIG. 7a
FIG. 7b
FIG. 7c

SPREAD SPECTRUM CODE PULSE POSITION MODULATED RECEIVER HAVING DELAY SPREAD COMPENSATION

This application is a continuation-in-part of patent application Ser. No. 08/298,260, filed Aug. 30, 1994.

FIELD OF THE INVENTION

The present invention relates to a method and apparatus for spread spectrum code pulse position modulation communications, and more particularly, to a method and apparatus for receiving and decoding a spread spectrum code pulse position modulated signal transmitted over a dispersive transmission medium.

BACKGROUND OF THE INVENTION

In many communication applications, it is often desired, or required, to spread the frequency spectrum of a transmitted signal by a given factor. For example, in the United States, the Industrial, Scientific and Medical (ISM) frequency band has historically been reserved for the operation of industrial, scientific and medical instruments. Recently, however, the Federal Communications Commission (FCC) has indicated that the ISM band may be utilized under certain conditions for communication applications, such as local area networks (LANs). Specifically, in order not to interfere with the operation of industrial, scientific and medical devices, the FCC requires that the frequency spectrum for communications in the ISM band be spread by a factor of at least 10. This is typically accomplished by encoding each bit to be transmitted using a predefined codeword, or pattern, consisting of at least 10 "chips" or "signal elements" which are all transmitted in the time frame normally allocated for a single bit.

The Institute for Electrical and Electronic Engineers has developed a standard for communications in the ISM band that utilizes the well known Barker code having a defined pattern of eleven chips, namely, "00011101101", as the basic information carrier. Thus, the Barker code may be utilized to represent a value of binary "0" and the inverse of the Barker code may be utilized to represent a value of binary "1", or vice-versa. Accordingly, for each transmitted eleven chip Barker code, one bit of information is conveyed.

Frequently, such spread spectrum systems will increase the bit rate by transmitting a number of bits during a single bit duration by utilizing phase-shift keying (PSK) modulation, wherein the phase of the carrier signal is shifted to represent data. In a quadrature phase-shift keying (QPSK) implementation, phase shifts in multiples of 90° are utilized. Thus, four possible signal states may be represented by each of the four phases. Accordingly, each signal element can represent two bits rather than one.

Although additional gains in the bit rate could be achieved by extending these phase shifting schemes, for example, to transmit three bits per signal element, by providing eight phase angles, the increase in transmission power that would be required to achieve adequate error rate performance presently makes such schemes impractical.

In addition, many transmission media, such as wireless radio channels for a local area network, exhibit delay spread of the transmitted signal, which results from the different arrival times of multiple signal components due to multipath propagation. Thus, due to the delay spread, some of the signal components of one transmitted spread spectrum codeword may spill over into other chip positions of the same or adjacent symbols, or even into chip positions of symbols on the quadrature channels, causing the received signal to be distorted.

When the delay spread of a particular channel causes residual coupling between the signals on quadrature channels during a symbol interval, such as in the QPSK implementation discussed above, it is referred to as interchip interference (ICI). Interchip interference addresses the symmetric cross-rail effect that the signals on the quadrature channels of a given symbol interval have on one another. In addition, the delay spread of a particular channel may also cause intersymbol interference, where the spread spectrum codewords transmitted during one symbol interval influence the spread spectrum codewords transmitted during one or more successive symbol intervals.

As is apparent from the above discussion of conventional spread spectrum communication techniques, a need exists for a spread spectrum pulse position modulated receiver that compensates for the delay spread induced by the transmission media. In particular, a need exists for a receiver that decodes a transmitted spread spectrum pulse position modulated signal in the presence of delay spread, taking into account the cross-rail or bias influence caused by the residual coupling between the signals on quadrature channels for a given symbol duration, as well as for the influence of spread spectrum codewords transmitted during one or more successive symbol intervals on one another.

SUMMARY OF THE INVENTION

Generally, according to one aspect of the invention, a communication system, suitable for use in frequency spreading applications, employs spread spectrum code pulse position modulation encoding, conveying information by modulating the polarity and position of the center of the transmitted spread spectrum codewords within the symbol duration.

Another aspect of the invention provides a spread spectrum code pulse position modulated receiver that compensates for the delay spread of a transmission medium. Delay spread may cause signal components of one transmitted spread spectrum codeword to spill over into chip positions of adjacent symbols, causing intersymbol interference, or into chip positions on quadrature channels of a given symbol interval, such as in a QPSK implementation, causing interchip interference.

An additional aspect of the invention provides a receiver capable of decoding a transmitted spread spectrum code pulse position modulated signal in the presence of such delay spread. The receiver utilizes a tentative symbol estimator to sample the output of one or more filters matched to the spread spectrum codewords and to the delay spread characteristics of the communication channel. The tentative symbol estimator will assign a weight to each potential symbol value, taking into account the cross-rail or bias influence caused by the residual coupling between the signals on quadrature channels for a given symbol duration.

In addition, the receiver includes a mode sifter which evaluates the weighted values for each symbol estimate, as assigned by the tentative symbol estimator. The mode sifter will assign final estimates to each symbol value, taking into account the influence of codewords transmitted during one or more successive symbol intervals on one another.

In an alternate embodiment, the effect of intersymbol interference is taken into account in the tentative symbol estimator before any possible state values are discarded. In this embodiment, the tentative symbol estimator will sample the output of one or more filters matched to the spread spectrum codewords and to the delay spread characteristics of the communication channel. The tentative symbol estimator will assign a weight to each potential symbol value, taking into account the cross-rail or bias influence caused by the residual coupling between the signals on quadrature channels for a given symbol duration, as well as the influence of codewords transmitted during one or more successive symbol intervals on one another. Thereafter, the mode sifter will evaluate the weighted values for each symbol estimate, as assigned by the tentative symbol estimator, to select the final estimate for each symbol value having the greatest weight.

A more complete understanding of the present invention, as well as further features and advantages of the invention, will be obtained by reference to the detailed description and drawings.

BRIEF DESCRIPTION OF THE DRAWINGS

FIG. 4 is a schematic block diagram of an illustrative spread spectrum position modulated transmitter according to the present invention;

FIG. 5 is a schematic block diagram of an illustrative spread spectrum position modulated receiver according to the present invention;

FIGS. 7a through 7c are schematic block diagrams illustrating the preamble processing of a training pulse in order to generate an estimate of the channel response and the autocorrelation of a transmitted pulse;

FIG. 16b is a schematic block diagram illustrating one of the state blocks of the mode sifter of FIG. 16a;

DETAILED DESCRIPTION

The present invention provides a method and apparatus for modulating and demodulating a communication signal using spread spectrum encoding. The present invention improves on conventional spread spectrum modulation techniques by also modulating the position of the transmitted spread spectrum code which, upon matched filtering, modulates the position of the main lobe in the receiver output. In this manner, additional information may be conveyed per symbol duration.

As previously indicated, it is often desirable, or required, to spread the frequency spectrum of a transmitted signal by a factor of n. This is typically accomplished by encoding each bit to be transmitted using a predefined codeword, or pattern, consisting of n "chips" or "signal elements" which are all transmitted in the time frame normally allocated for a single bit. In a preferred embodiment, often referred to as antipodal encoding, the predefined codeword may be utilized to represent a value of binary "0" and the inverse of the predefined codeword may be utilized to represent a value of binary "1". Alternatively, a bit of information can be conveyed by selecting from one of two predefined codewords.

A number of spread spectrum codes, consisting of a number of consecutive positive and negative signal elements, have been discovered which have unique properties that optimize the detection of the transmitted information. For example, a number of well known spread spectrum codes have been discovered by Barker, Neuman-Hofman, and Williard. For a discussion of these and other suitable spread spectrum codes, see Ning Zhan and S. W. Golomb, "Sixty Phase Generalized Barker Sequences," I.E.E.E. Trans. on Information Theory, Vol. 35, No. 4 (July, 1989), incorporated herein by reference.

Figure 1:
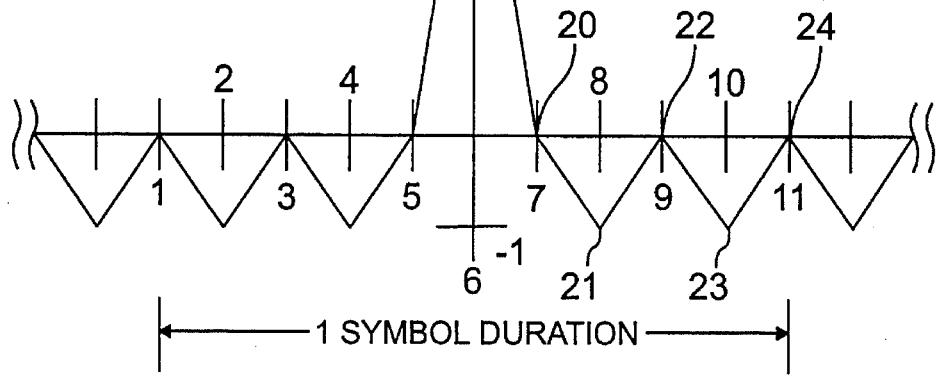
FIG. 1 is a graphical illustration of the correlation function at the output of a matched filter for an eleven chip Barker Code.

The particular patterns for the spread spectrum codes are chosen such that when the pattern is detected at the output of a filter matched to the characteristics of the selected pattern, the amplitude of the main lobe is much greater than the amplitude of the side lobes. FIG. 1 illustrates the output 10 of a matched filter for the well known 11 chip Barker code, which has a pattern of "+++−−−+−−+−", corresponding to a binary value of "0". Since the amplitude of the main lobe 15 is eleven times greater in magnitude than the amplitude of any side lobe, such as the side lobes 21 and 23, the position of the main lobe 15 may be easily identified, even under possible change in polarity.

Figure 2:
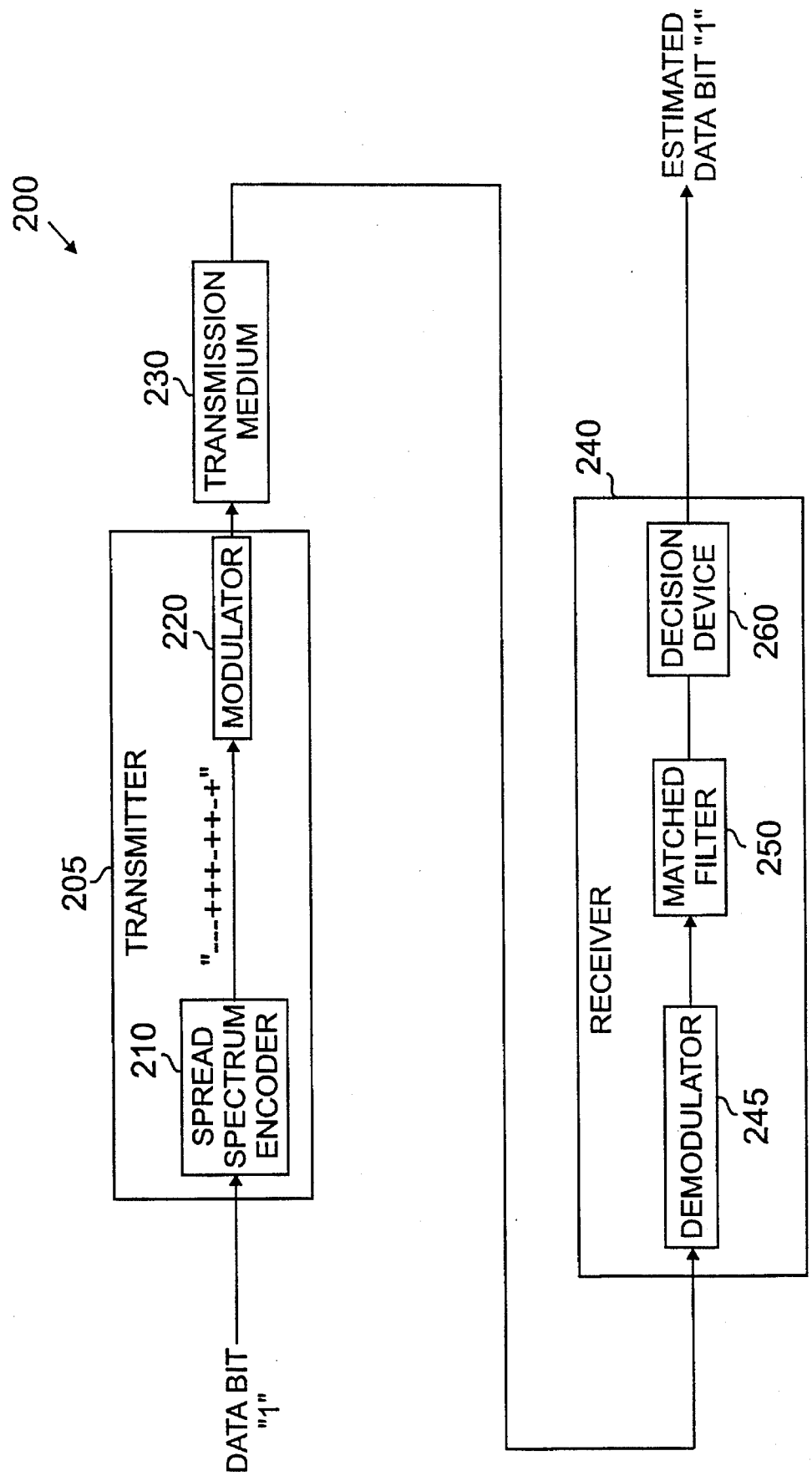
FIG. 2 is a schematic block diagram illustrating an exemplary spread spectrum communication system in accordance with the prior art.

Accordingly, as shown in FIG. 2, in order to transmit data using a conventional spread spectrum communication system 200, each bit to be sent by a transmitter 205 is first encoded by a spread spectrum encoder 210. Thus, if the encoder 210 is embodied as a Barker code generator, and a binary value of "1" is to be transmitted, the encoder 210 will generate a pattern of "——+++—++—+", which is the inverse Barker code. This information signal will then be modulated in a conventional manner by modulator 220 prior to transmission over a transmission medium 230, which may be embodied as a conventional or wireless telecommunications network. The modulator 220 may employ a modulation technique, for example, which multiplies the codeword by a sinusoidal carrier wave in order to shift the signal frequency upward to the carrier frequency. In this manner, the original signal spectrum may be translated into a particular frequency band allocated by the FCC, or another regulatory body.

Upon receipt of the transmitted signal by the receiver 240, the frequency of the received signal is first shifted down to the base band signal by a demodulator 245, thus returning the signal to its original form prior to modulation. Thereafter, the received signal is passed through a filter 250 that is matched to the characteristics of the particular codeword. A decision device 260 will identify whether the peaks associated with the main lobes at the output of the matched filter 250 have a positive or negative value. A positive main lobe may indicate a binary value of "0", and a negative main lobe may be utilized to indicate a binary value of "1".

As previously indicated, conventional spread spectrum systems will frequently increase the bit rate by transmitting a number of bits during a single symbol duration by utilizing phase-shift keying (PSK) modulation, wherein the phase of the carrier signal is shifted to represent data. In a quadrature phase-shift keying (QPSK) implementation, phase shifts in multiples of 90° are utilized. Thus, four possible signal states may be represented by each of the four phases. Accordingly, each signal element can represent two bits rather than one.

In a conventional spread spectrum code implementation, four possible signal states are achieved by modulating two orthogonal carrier signals, such as a sine and a cosine wave, by a positive or negative spread spectrum codeword. Thus, the sine wave modulated by a positive codeword can represent a binary value of "1" of a first bit, and when modulated by a negative codeword can represent a binary value of "0". Similarly, the concurrently transmitted cosine wave modulated by a positive codeword can represent a binary value of "1" of a second bit, and when modulated by a negative codeword can represent a binary value of "0". Thus, two bits of information may be conveyed per bit duration.

It is noted that the cosine wave-modulated codeword is frequently referred to as the in-phase (I) signal, and the sine wave-modulated codeword is frequently referred to as the quadrature (Q) signal.

According to one feature of the present invention, the information rate that may be achieved with spread spectrum modulation techniques may be further increased by modulating the position of the main lobe associated with the transmitted codeword at the output of the matched filter.

As shown in FIG. 1, for example, the eleven chip Barker code, upon matched filtering, will have a main lobe at position six that is one chip wide. Thus, additional information can be conveyed by manipulating the position of the main lobe, upon matched filtering, to appear in one of the other chip positions. If the position of the main lobe is varied among eight of the positions, eight signal states are available, and three additional bits may thereby be conveyed. Thus, one bit is conveyed by detecting the sign of the main lobe, and three additional bits are conveyed by detecting the position of the main lobe, for a total of four bits conveyed per symbol duration.

Further, in an implementation where the codeword is modulated by two orthogonal carrier signals, such as a sine and a cosine wave, as discussed above, a total of eight bits may thus be conveyed. Alternatively, a plurality of independently generated codewords may each be modulated by a respectively distinct carrier signal having a unique phase, amplitude or frequency. It is further noted that if a spread spectrum codeword having at least 16 chips is utilized, 16 signal states are available, and thus four additional bits of information could be conveyed for each codeword by modulating the position of the main lobe among 16 available positions.

Figure 3:
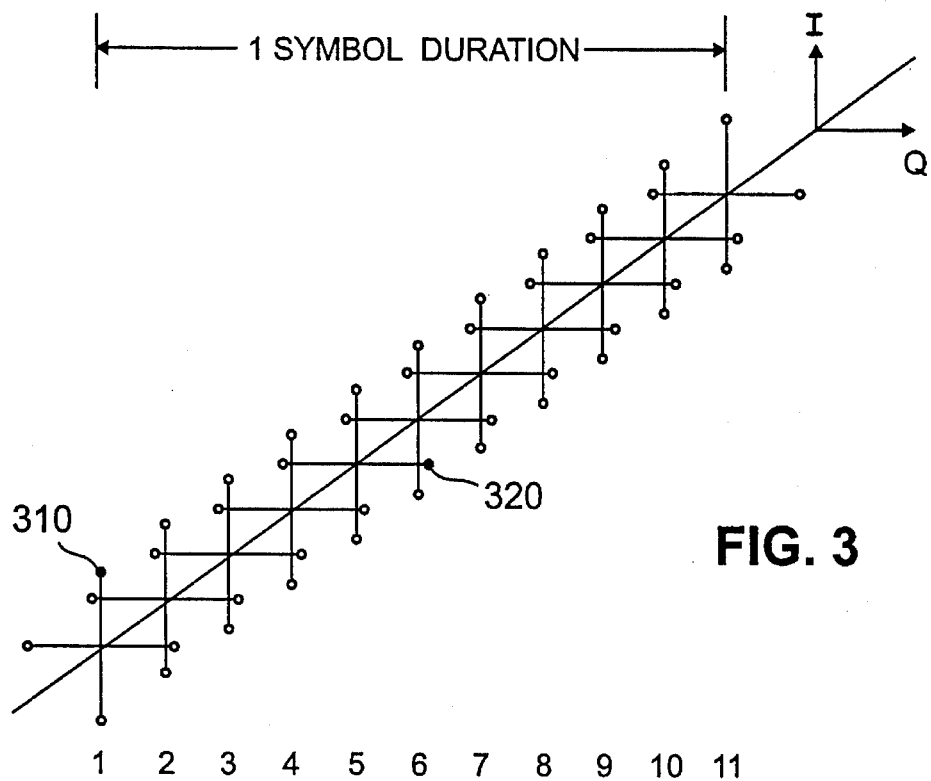
FIG. 3 is a graphical illustration of the modulation of the sign and position of the main lobe, upon matched filtering, for an eleven chip spread spectrum code.

FIG. 3 provides a graphical representation of the modulation of the sign and position for an eleven-chip spread spectrum code using two orthogonal carrier signals, I and Q. As previously indicated, in the illustrative embodiment, the position of the main lobe is manipulated to occupy one of eight available chip positions. Accordingly, the main lobe of the I signal may be positive or negative and occupy one of eight positions. Similarly, the main lobe of the Q signal may be positive or negative and occupy one of eight positions. Bullet points 310 and 320 are utilized in FIG. 3 to indicate the sign and position of the I and Q signals. In the illustration of FIG. 3, the I signal is positive, and is at location one, as shown by bullet point 310, while the Q signal is positive and is at location five, as shown by bullet point 320. As previously indicated, the illustrative embodiment may be utilized to convey eight bits of information.

In one embodiment, discussed further below, the position of the main lobe, upon matched filtering, may be manipulated within the defined symbol period by delaying the transmission of the codeword, by a positive or negative time period. Thus, in an implementation using an eleven chip codeword, if it is desired to position the main lobe in position 8, rather than in position 6, the natural position of the main lobe, the codeword generator should delay the transmission of the codeword by 2/11 of the symbol period. Similarly, if it is desired to position the main lobe in position 2 rather than in position 6, the codeword generator should advance the transmission of the codeword by 4/11 of the symbol period.

It is noted that a common problem in many transmission media is the delay spread of the transmitted signal which results from the different arrival times of multiple signal components due to multipath propagation. For example, in a wireless local area network, signal components will have different propagation times due to multipath propagation that results from rays bouncing off boundaries, such as walls and floors. As a result, it is not uncommon for a one microsecond pulse to spread to five microseconds.

Due to the delay spread of the received signal, some of the signal components of one bit position may spill over into other bit positions, causing intersymbol interference (ISI). The effects of delay spread are minimized by conventional equalizing techniques, discussed further below, which serve to "squeeze" the pulses into the proper symbol time.

It is also noted that when the transmission of a spread spectrum codeword is delayed relative to the symbol duration period, in order to modulate the position of the main lobe at the receiver output, in accordance with the present invention, some of the side lobes may actually spill over into an adjacent symbol duration period. However, since the amplitudes of the side lobes are much less than the amplitude of the main lobe, the interference on the adjacent symbols caused by the techniques of the present invention is negligible with respect to the interference that results from more conventional sources, such as the delay spread that results from multipath propagation.

In addition, when there are additional chip positions available which are not utilized to convey information, such as in the illustrative embodiment where only eight of the eleven available chip positions are utilized, the additional unused positions serve as a guard band or buffer for purposes of further minimizing intersymbol interference.

FIG. 4 is an exemplary implementation of a spread spectrum position modulated transmitter 400 in accordance with the present invention. In the exemplary transmitter 400, the bits to be sent by the transmitter 400 are first encoded by an encoder 410. For each 8 bit word to be transmitted, the encoder 410 will calculate the sign of the I and Q signals, $I_{sgn}$ and $Q_{sgn}$; in other words, whether the I and Q pulses, respectively, should have positive or negative pulses. In addition, the encoder 410 will calculate the position of the I and Q signals, $I_{pos}$ and $Q_{pos}$. It is noted that in the preferred embodiment, the values $I_{pos}$ and $Q_{pos}$ can be positive or negative time delay values, and indicate the time at which the respective spread spectrum code generators 420, 440, discussed below, should generate the spread spectrum code relative to the symbol duration period.

The encoder 410 and the spread spectrum code generators 420, 440, each operate according to the timing information that is received from the timing generator 430, which will generate time pulses in accordance with the symbol duration period, as appropriate for the preselected spread spectrum codeword. Specifically, in the illustrative embodiment, the encoder 410 will read in eight data bits to be transmitted for each indicated symbol duration period.

Thereafter, the encoder 410 will calculate the $I_{sgn}$, $Q_{sgn}$, $I_{pos}$ and $Q_{pos}$ values, preferably in a Gray encoded manner. The encoder 410 preferably Gray-encodes in each coordinate, such that opposite binary input data sequences are allocated to opposite polarity Barker codes. For example, if the following sequences are allocated to I-position three and Q-position five, then the following sequences are allocated to:

| Binary Sequence | I, Q Polarity |
|---|---|
| 00100100 | +I, +Q |
| 00100101 | +I, −Q |
| 00100110 | −I, +Q |
| 00100111 | −I, −Q. |

The spread spectrum code generators 420, 440 will receive the appropriate time delay value, either $I_{pos}$ or $Q_{pos}$, and will then generate the spread spectrum codeword in accordance with the calculated delay value, relative to the spread spectrum symbol interval center. In this manner, the main lobes of the I and Q signals will be shifted appropriately, in order to convey the desired information.

The time-shifted codewords generated by the spread spectrum code generators 420, 440 will be multiplied by the polarity values indicated by the $I_{sgn}$ and $Q_{sgn}$ values, respectively, by the mixers 445 and 450. Thus, the output of the mixers 445 and 450 will be the two information carrying signals, in other words, the positive or negative values of the time-shifted spread spectrum codeword, as appropriate.

The information carrying signals will then be modulated in a conventional manner by modulator 455 prior to transmission. The modulator 455 may employ a modulation technique, for example, which multiplies the I signal time-shifted codeword by a cosine wave using mixer 465, and the Q signal time-shifted codeword by a sine wave using mixer 470. In this manner, the signal frequencies of the original information signals are shifted upward to the carrier frequency associated with the carrier oscillator 460, which may, for example, be in a particular frequency band allocated by the FCC, or another regulatory body.

The modulated I and Q signals will then be combined using an adder 475, before passing through conventional RF stages 480, which serve to amplify the modulated signals. Thereafter, the combined modulated I and Q signals may be transmitted over a transmission medium to a receiver 500, discussed below in conjunction with FIG. 5. The transmission medium may be embodied as a wired or a wireless telecommunications network.

FIG. 5 is an exemplary implementation of a spread spectrum position modulated receiver 500 in accordance with the present invention. In the exemplary receiver 500, the frequency of the received signal first passes through RF and IF stages 510, which serve to filter the received signal from the adjacent channel interference and to amplify the received signal. Thereafter, the frequency of the received signal is shifted down to the base band signal by a conventional demodulator 520, in order to return the received signal to its original form prior to modulation. In the illustrative embodiment, the I modulated signal is returned to baseband by multiplying it with a cosine wave, generated by carrier oscillator 530, using mixer 525, in order to isolate the I signal time-shifted codeword. In addition, the Q modulated signal is returned to baseband by multiplying it with a sine wave, using mixer 535, in order to isolate the Q signal time-shifted codeword.

The demodulated I signal time-shifted codeword and the Q signal time-shifted codeword are then passed through spread spectrum code decorrelators 540 and 545, respectively. The spread spectrum code decorrelators 540 and 545 are filters matched to the preselected codeword, in a known manner. Thus, the output of the spread spectrum code correlators 540 and 545 will be the correlation function of each signal, similar to the correlation function illustrated in FIG. 1 for an eleven chip Barker code. Due to the effects of delay spread, however, the main lobe and side lobes may be spread into the time period of an adjacent symbol, over the inherent spreading due to the Barker code side lobes themselves.

Accordingly, the I and Q signals are preferably conditioned by complex channel conditioners 550 and 555, respectively, which serve to compensate for the delay spread of the communication channels, in a known manner. The complex channel conditioners 550 and 555 may be embodied as a complex equalizer, of known type, or as filters which are matched to the particular delay spread characteristics of the communication channel, for example, by measuring the channel impulse by using a preamble signal before transmitting the data.

The conditioned I and Q signals, $I_c$ and $Q_c$, may then be analyzed to identify the sign and the position of each main lobe. In the illustrative embodiment, the eight chip positions of the I and Q signals that are utilized to convey information are preferably sampled and stored using eight-position registers 560 and 565, respectively. Thus, each position of the register 560, 565 will contain the amplitude value of the corresponding chip position of the I and Q signals.

Thereafter, the values stored in the positions of the registers 560 and 565 are analyzed by a decision device 570 in order to detect the sign and position of the main lobes of the I and Q signals and translate this information into the appropriate eight bit binary word. In a preferred embodiment, the decision device 570 identifies the sign and position of the main lobe of the I and Q signals by selecting the largest stored amplitude value in each of the registers 560 and 565, respectively. As previously indicated, in the illustrative embodiment, the sign of the main lobe of the I signal conveys one bit, and the position of the main lobe conveys an additional 3 bits. Similarly, the sign of the main lobe of the Q signal conveys one bit, and the position of the main lobe conveys an additional 3 bits. Thus, a total of eight bits of information are conveyed.

It is noted that where residual coupling occurs between the I and Q signals, the coupling coefficients can be taken into account in a more complex decision device 570.

As previously indicated, many transmission media exhibit delay spread of the transmitted signal, which results from the different arrival times of multiple signal components due to multipath propagation. Due to the delay spread, some of the signal components of one chip position may spill over into other chip positions of the same or adjacent symbols, or even into chip positions of symbols on the opposite rail, in other words, onto the opposite I or Q channel, effectively causing a loss of energy in the sampled signal.

When the delay spread of a particular channel causes residual coupling between the I and Q signals of a given symbol interval, it is referred to as interchip interference (ICI). Interchip interference addresses the symmetric cross-rail effect that the I and Q signals of a given symbol interval have on one another. In addition, as previously indicated, the delay spread of a particular channel may also cause intersymbol interference, where the I and Q spread spectrum codewords transmitted during one symbol interval influence the I and Q spread spectrum codewords transmitted during one or more successive symbol intervals.

In the discussion which follows, the correction term for interchip interference, namely, the cross-rail influence or bias term, is labelled $B(l_a-l_b)$, where $l_a$ and $l_b$ denote the location of the main lobes, upon matched filtering, of the I and Q spread spectrum codewords, respectively. In addition, the correction term for intersymbol interference, also referred to as the trellis correction term, quantifies the influence on a symbol $i(k+1)$ of the previous k symbols, $\{i(k), i(k-1), \ldots, i(1)\}$, and is labelled $G(i(k+1), \{i(k), i(k-1), \ldots, i(1)\})$. In the illustrative embodiment, it is assumed that the channel memory is not more than one symbol duration. In other words, a symbol will only be affected by the previous symbol, and thus, the trellis correction terms, $G(i(k+1), i(k))$, quantify the influence on the symbol $i(k+1)$ of the previous symbol, $i(k)$. Although a channel memory of one symbol duration provides for sufficient operation for most dispersive communication systems, the embodiments and variations shown and described herein may be easily extended to communication systems having channel memories with a length greater than one, as would be apparent to one of ordinary skill in the art, based on the disclosure herein.

It is noted that in the illustrative embodiment, each symbol $i(k)$ represents eight bits, and is defined by the position of the main lobes, $l_a$ and $i_b$, upon matched filtering, of the I and Q spread spectrum codes, as well as the polarity, a and b, of the I and Q spread spectrum codes, respectively. Thus, in the illustrative embodiment, each eight bit symbol, $i(k)$, is defined by (a, b, $l_a$ and $l_b$).

Figure 6:
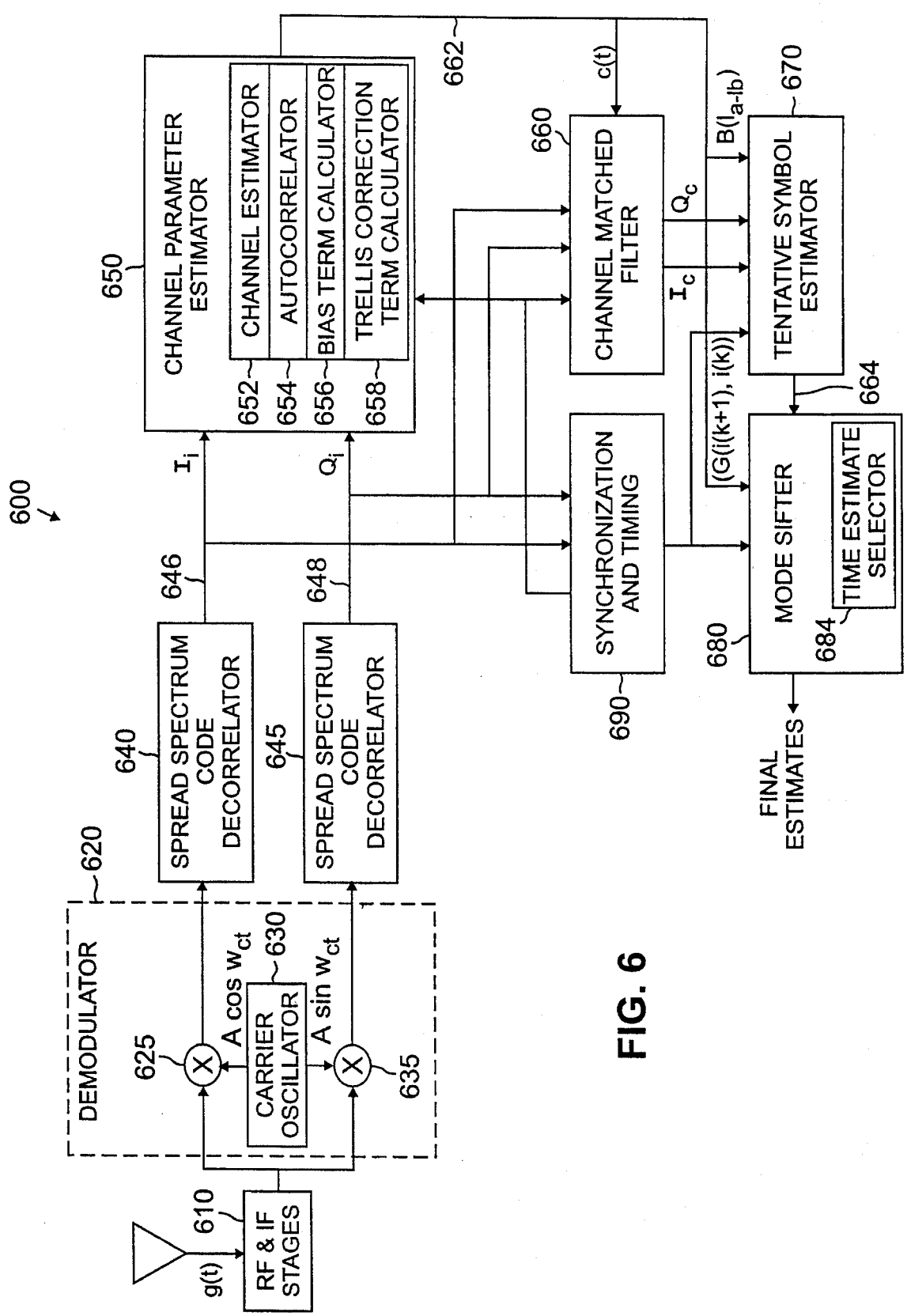
FIG. 6 is a schematic block diagram of an illustrative spread spectrum pulse position modulated receiver having delay spread compensation according to a feature of the present invention.

FIG. 6 is an exemplary implementation of a spread spectrum code pulse position modulated receiver 600 having delay spread compensation in accordance with the present invention. A spread spectrum code pulse position modulated signal is defined to be a signal which, upon matched filtering, will indicate the polarity and position of the main lobe of a spread spectrum codeword, such as a Barker code or an orthogonal pulse position modulated signal.

In the exemplary receiver 600, the received signal, labelled g(t), first passes through RF and IF stages 610, which serve to filter and amplify the received signal. It is noted that the signal, g(t), received at the input of the RF and IF stages 610, is the complex product of the encoded data, namely, the positive or negative position modulated spread spectrum codewords transmitted by the transmitter 400, labelled q(t), and the estimate of the impulse response of the transmission channel, labelled c(t). Thus, in order to decode the transmitted data, the receiver 600 must convolve the received signal, g(t), with the conjugate of the spread spectrum codeword, q(t)*, and with the conjugate of the channel impulse response estimate, c(t)*, in a manner described below.

It is noted that the conjugate of the spread spectrum codeword, q(t)*, such as the Barker codeword, is the same as the codeword itself, because the codeword is a set of real numbers. It is further noted that in this context, spread spectrum codewords are defined to include purely orthogonal pulse position modulated signals, where the main lobe the transmitted pulse, upon matched filtering in the receiver 600, has a given magnitude and each of the side lobes has a magnitude approximately equal to zero, as well as the quasi-orthogonal codewords, such as the Barker codes discussed above.

After the received signal, g(t), is processed by the RF and IF stages 610, the frequency of the received signal is shifted down to the baseband signal by a conventional demodulator 620, in order to return the received signal to its original form prior to modulation. In the illustrative embodiment, the I modulated signal is returned to baseband by multiplying it with a cosine wave, generated by carrier oscillator 630, using mixer 625, in order to isolate the I signal time-shifted codeword. In addition, the Q modulated signal is returned to baseband by multiplying it with a sine wave, using mixer 635, in order to isolate the Q signal time-shifted codeword.

In order to implement the digital processing described below, the demodulated baseband signals are preferably passed through an analog to digital convertor (not shown). Thereafter, the demodulated I signal time-shifted codeword and the Q signal time-shifted codeword are then passed through spread spectrum code decorrelators 640 and 645, respectively. The spread spectrum code decorrelators 640 and 645 are filters matched to the preselected codeword, in a known manner. In other words, the spread spectrum code decorrelators 640 and 645 will convolve the baseband signal, g(t), with the conjugate of the spread spectrum codeword, namely, q(t)*. Thus, the output of the spread spectrum code decorrelators 640 and 645, labelled $I_i$ and $Q_i$, respectively, will be the correlation function of each signal, similar to the correlation function illustrated in FIG. 1 for an eleven chip Barker code. Due to the distortion effects of the channel, however, components of the I and Q signals may be spread into the time period of adjacent symbols, and the I and Q signals may have had a cross-rail influence on one another.

Thus, according to one feature of the present invention, the I and Q signals are preferably processed by the receiver 600 to compensate for the delay spread and other effects of the transmission channel. In order to compensate for the loss of energy of the received signal due to the delay spread, as well as for any phase shifts induced by the channel, the receiver 600 preferably includes a filter 660, matched to the particular delay spread characteristics of the communication channel, which will collect the appropriate energy into each sample in a manner described below in conjunction with FIGS. 7 and 8. However, some of the energy that is gathered up for a particular sample by the channel matched filter 660 will actually be attributable to interchip and intersymbol interference.

Thus, in order to compensate for interchip interference, the receiver 600 preferably includes a tentative symbol estimator 670, discussed below, which, among other things, samples the $I_c$ and $Q_c$ signals, at the output of the channel matched filter 660, and assigns a weight to each potential symbol value, taking into account the quantity, $B(l_a-l_b)$, referred to below as the bias term, of the I and Q signals of a given symbol on one another. Finally, in order to compensate for intersymbol interference, the receiver 600 includes a mode sifter 680, discussed below, which, among other things, evaluates the weighted values for each symbol estimate, as determined by the tentative symbol estimator 670, and assigns final estimates to each symbol value, taking into account the influence, $G(i(k+1), i(k))$, of adjacent symbols on one another.

In order to evaluate the characteristics of the transmission channel, each transmitted packet preferably includes a training sequence having a predefined length, in addition to the data sequence. Although the channel estimate, c(t), can be obtained from a single transmitted pulse, it is preferred that the training sequence is sufficiently long to provide an accurate assessment of the channel characteristics and to mitigate the effects of the additive noise.

In a preferred embodiment, the training sequence can be analyzed by a channel parameter estimator 650 to derive a number of parameters which compensate for the delay spread of the channel. Preferably, the channel parameter estimator 650 calculates the channel estimate, c(t), which compensates for phase shifts and the amplitude distortion caused by the channel; the bias correction terms, $B(l_a-l_b)$, which compensate for interchip interference; and the trellis correction terms, $G(i(k+1), i(k))$, which compensate for intersymbol interference. In an extension of this embodiment, the channel parameter estimator 650 can continue monitoring the actual data sequence as well, in order to update the calculated compensation parameters, c(t), $B(l_a-l_b)$ and $G(i(k+1), i(k))$, throughout the data packet.

During the training sequence, the channel parameter estimator 650 accepts the correlated baseband signals, $I_i$ and $Q_i$, received from the symbol correlators 640, 645 by means of data links 646 and 648, respectively. Thereafter, the channel parameter estimator 650 estimates the channel parameters from the sequence of $I_i$ and $Q_i$ values over the entire duration of the training sequence. The channel parameter estimator 650 will then pass the calculated channel estimate, c(t), to the channel matched filter; the bias correction terms, $B(l_a-l_b)$, to the tentative symbol estimator 670; and the trellis correction terms, $G(i(k+1), i(k))$, to the mode sifter 680, as shown in FIG. 6, by means of data link 662.

The channel parameter estimator 650 preferably includes a channel estimator 652, discussed below in conjunction with FIG. 8, for calculating the channel estimate, c(t). In addition, the channel parameter estimator 650 preferably includes an autocorrelator 654, discussed below in conjunction with FIG. 9, for calculating an autocorrelation function, which is used in calculating the bias correction terms, $B(l_a-l_b)$, and the trellis correction terms, $G(i(k+1), i(k))$. The channel parameter estimator 650 preferably also includes a bias term calculator 656, discussed below in conjunction with FIG. 11, for calculating the bias correction terms, $B(l_a-l_b)$. Finally, the channel parameter estimator 650 preferably also includes a trellis correction term calculator 658, discussed below in conjunction with FIG. 12, for calculating the trellis correction terms, $G(i(k+1), i(k))$.

The channel matched filter 660 receives the channel estimate, c(t), calculated by the channel parameter estimator 650, by means of data link 662. As discussed further below in conjunction with FIG. 7, the channel matched filter 660 will compensate for any phase shifts or amplitude distortion caused by the delay spread of the channel by convolving the correlated received signals, $I_i$ and $Q_i$, with the channel estimate, c(t).

In this manner, the channel matched filter 660 will process the correlated signals, $I_i$ and $Q_i$, that arrive during transmission of the data sequence, after the training sequence has been processed by the channel parameter estimator 650, and will generate the matched filter data, $I_c$ and $Q_c$.

The tentative symbol estimator 670 will thereafter analyze the matched filter data, $I_c$ and $Q_c$, over all the chip positions in a given symbol period in order to make a tentative decision about the transmitted symbol. As previously indicated, in the illustrative embodiment, each transmitted symbol conveys eight bits of information by modulating the polarity, a and b, and position, $l_a$ and $l_b$, of the transmitted I and Q spread spectrum codes, respectively. Thus, there are $2^8$, or 256 possible signal states.

The tentative symbol estimator 670 will evaluate the likelihood of each of the 256 possible signal states, or modes, for a particular symbol and assign a weight to each mode, in a manner described below in conjunction with FIG. 13. In one embodiment, the weight assigned to each mode is based upon two factors, namely, the sampled $I_c$ and $Q_c$ values measured for the respective symbol, and the precomputed bias terms, $B(l_a-l_b)$, received from the channel parameter estimator 650, by means of data link 662. Although the theoretical maximum likelihood sequence estimator prescribed a prohibitively complex trellis comprised of all 256 possible states of the likelihood function, it has been found that a small number of modes, such as three or four out of the 256 possible states, provide satisfactory results and maintain a manageable level of computational complexity. In the illustrative embodiment, the four highest weighted modes will be maintained and are referred to as the multimodal estimates or retained states.

The surviving multimodal estimates or retained states are passed to the mode sifter 680, by means of data link 664. The mode sifter 680 will evaluate the weighted multimodal estimates, in a manner discussed below in conjunction with FIGS. 14 through 16, in order to assign the final estimates to each symbol value, using a final estimate selector 684, discussed below in conjunction with FIG. 17. The mode sifter 680 will take into account the influence, $G(i(k+1), i(k))$, of adjacent symbols on one another when assigning the final estimates. The trellis correction terms, $G(i(k+1), i(k))$, are received from the channel parameter estimator 650 by means of data link 662.

In addition, the receiver 600 includes a synchronization and timing unit 690, in order to generate the necessary timing information. Preferably, the synchronization and timing unit 690 receives the correlated data, $I_t$ and $Q_t$, by means of data links 646 and 648, respectively, in order to derive the chip and symbol timing information, in a known manner.

ILLUSTRATION OF PREAMBLE PROCESSING

As previously indicated, the receiver 600 will utilize a channel matched filter 660 to compensate for any phase shifts or amplitude distortion caused by the delay spread of the channel. If, as shown in FIG. 7a, a single pulse 732 was transmitted by a transmitter 710 at a time $t_0$, the delay spread of the transmission medium 715 might cause the energy of the pulse 732 to be dispersed. For example, the signal received at the receiver 720 might consist of a primary pulse 734, having an energy $e_0$, received at time $t_0$, while an echo pulse 736, having an energy $e_1$, is received at time $t_1$. It is noted that when a sampled pulse, such as the pulse 734 or 736, has a measured energy, such as $e_0$ and $e_1$, respectively, the amplitude of the pulse is proportional to the square root of the energy. Thus, pulse 734 has an amplitude, $a_0$, proportional to the square root of $e_0$, and the pulse 736 has an amplitude, $a_1$, proportional to the square root of $e_1$.

As is well known, the transmission of a single pulse in this manner allows the channel estimate, $c(t)$, and the autocorrelation function, $L(t)$, to be calculated. However, in an actual implementation, it is preferred that the channel estimate, $c(t)$, and the autocorrelation function, $L(t)$, are calculated based upon the transmission of a number of pulses, in order to average out the effects of the additive noise.

It is noted that the received signal is, in general, a complex signal, having both real and imaginary components. Thus, the energy, $e_0$, measured at time $t_0$ may be found split randomly between the I and Q channels. Accordingly, the corresponding amplitude, $a_0$, would have a real component, $Re\{a_0\}$, measured in the I channel at time $t_0$, and an imaginary component, $Im\{a_0\}$, measured in the Q channel at time $t_0$, such that the sum of the squares $(Re\{a_0\}^2+Im\{a_0\}^2)$, will be proportional to the energy, $e_0$.

The channel matched filter 660, shown in greater detail in FIG. 7b, generates channel estimate coefficients, $c(t)$, in a known manner, for each component of the channel impulse response. Since the received signal corresponding to the single transmitted pulse 732 consists of two components in the current example, namely, pulse 734 at time $t_0$ and an echo pulse 736 at time $t_1$, the channel estimate will have two components, $c_0$ and $c_1$. The channel coefficient $c_0$ 740 will have a value equal to the conjugate of the amplitude of the pulse measured at time $t_0$, while the channel coefficient $c_1$ 745 will have a value equal to the conjugate of the amplitude of the pulse measured at time $t_1$.

When a single pulse 732 is transmitted, the channel matched filter 660 generates the autocorrelation of the transmitted pulse. As shown in FIG. 7c, at time $t_{-1}$, the only pulse aligned with a channel coefficient 740, 745 will be pulse 734 aligned with the $c_1$ coefficient 745 of the channel matched filter 660. Thus, the autocorrelation, $L(t)$, at time $t_{-1}$ is the complex product of $c_1$ and $a_0$. Similarly, at time $t_0$, the pulse 734 will be aligned with the $c_0$ coefficient 740 and the pulse 736 will be aligned with the $c_1$ coefficient 745. Thus, the autocorrelation, $L(t)$, at time $t_0$ is the complex product of $c_0$ and $a_0$ plus the complex product of $c_1$ and $a_1$. Finally, at time $t_1$, the pulse 736 will be aligned with the $c_0$ coefficient 740. It is noted that in the present example, $a_2$ is zero. Thus, the autocorrelation, $L(t)$, at time $t_1$ is the complex product of $c_0$ and $a_1$.

For example, if the transmission medium 715 of FIG. 7a is a real channel, without any complex components, and the single transmitted pulse 732 has an energy of magnitude one at time $t_0$, then the received signal may consist of a pulse 734 at time $t_0$, having an energy $e_0$ of 0.64, and an echo pulse 736 at time $t_1$, having an energy $e_1$ of 0.36. Accordingly, the corresponding amplitude $a_0$ of pulse 734 is 0.8 and the corresponding amplitude $a_1$ of echo pulse 736 is 0.6. Similarly, the channel coefficients, $c_0$ and $c_1$, would therefore also be 0.8 and 0.6, respectively, since the amplitudes $a_0$ and $a_1$ are real numbers.

Thus, the autocorrelation, $L(t)$, for the transmitted single pulse 732 of magnitude one in the current example, would have a value of 0.48 at time $t_{-1}$ ($c_1 a_0$); a value of 1.0 at time $t_0$ ($c_0 a_0 + c_1 a_1$); and a value of 0.48 at time $t_1$ ($c_0 a_1$). As expected, the autocorrelation function has its maximum value, 1, when the received signal is aligned with the channel coefficients 740, 745, namely, at time $t_0$.

Conceptually, the autocorrelation, $L(t)$, indicates how to account for the delay spread of the transmission medium 715. Although only a single pulse 732 of magnitude one was transmitted at time $t_0$, the output of the channel matched filter 660 had a value of 0.48 at time $t_{-1}$ and at time $t_1$, in addition to the expected value of 1.0 at time $t_0$. Thus, in the present example, for each transmitted pulse, a value of 0.48 must be subtracted from each time slot before and after a transmitted pulse. It is noted that, by definition, the autocorrelation function is symmetric, and thus, $L(-1)=L(1)$, since in this case, $L(1)$ is real.

Of course, in operation, the transmitted signal would not be a single transmitted pulse, but rather, a series of transmitted pulses. Accordingly, the amplitude or energy measured for a given instant of time may be attributable to one or more pulses. It is noted that the following example illustrates the concepts of delay spread and autocorrelation, and is not an example of the preferred embodiment, where only a single pulse would be transmitted on a given quadrature channel during any symbol interval. To illustrate, assume a first pulse of magnitude one was transmitted at time $t_0$ and a second pulse of magnitude one was thereafter transmitted in the following chip interval at time $t_1$. Thus, the received signal, due to the channel impulse response, would consist of the following components:

$t_0$: $a_0$=0.8 (primary component of first pulse)

$t_1$: $a_1$=1.4=0.6 (echo of first pulse)+0.8 (primary component of second pulse)

$t_2$: $a_2$=0.6 (primary component of second pulse).

Thus, the output of the channel matched filter 660 would have a value of 0.48 at time $t_{-1}$ ($c_1 a_0$); a value of 1.48 at time $t_0$ ($c_0 a_0 + c_1 a_1$); a value of 1.48 at time $t_1$ ($c_0 a_1 + c_1 a_2$) and a value of 0.48 at time $t_2$ ($c_0 a_2$). As discussed further below, the effect on the first pulse at time $t_0$ from the second pulse transmitted in the following time slot $t_1$ is the autocorrelation, $L(-1)$. Thus, in the present example, 0.48 must be subtracted from the measured amplitude, $a_0$, at time $t_0$. Similarly, the effect on the second pulse at time $t_1$ from the first pulse transmitted in the previous time slot $t_0$ is the autocorrelation, $L(1)$. Thus, in the present example, 0.48 must be subtracted from the measured amplitude, $a_1$, at time $t_1$.

As previously indicated, the tentative symbol estimator 670 and the mode sifter 680 will analyze the matched filter data, $I_c$ and $Q_c$, at the output of the channel matched filter 660, to identify the final estimates of the transmitted values, taking into account the effects of interchip and intersymbol interference. As discussed below, the correction terms for interchip and intersymbol interference, namely, $B(l_a-l_b)$ and $G(i(k+1), i(k))$, are both derived from the autocorrelation function, $L(t)$.

TRAINING SEQUENCE CALCULATIONS

As previously indicated, the channel parameter estimator 650 preferably includes a channel estimator 652 for calculating the channel estimate, $c(t)$. Although there are many well known techniques for estimating the channel impulse response, one preferred channel estimation technique is illustrated in FIG. 8.

Figure 8:
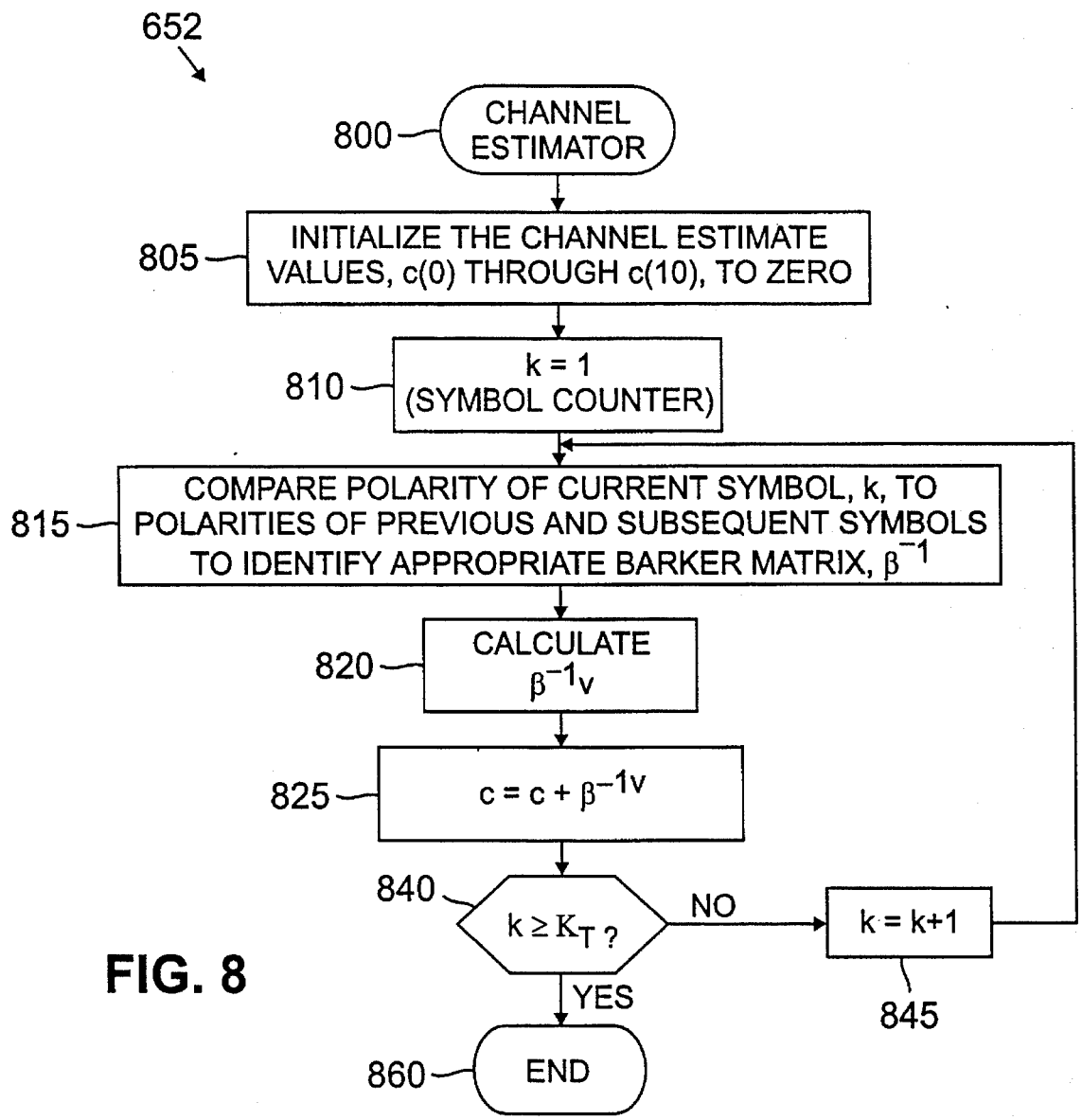
FIG. 8 is a flow chart describing an exemplary channel estimator suitable for utilization by the channel parameter estimator of FIG. 6 in calculating the estimate of the channel impulse response.

The channel estimator 652 is entered during step 800, as shown in FIG. 8. Each of the channel estimate values, $c(0)$ through $c(10)$ in the illustrative example, are preferably initialized to zero during step 805. Thereafter, a counter, $k$, is set to one during step 810. The counter, $k$, will be utilized to step through each symbol in the training sequence of each transmitted packet.

As previously indicated, the channel estimate vector, $c$, is preferably averaged over a sufficiently long training sequence to mitigate the effect of the additive noise. The channel estimate will be calculated by the channel parameter estimator 650 by evaluating the outputs, $I_i$ and $Q_i$, of the spread spectrum code decorrelators 640, 645, respectively. In the discussion which follows, the outputs of the spread spectrum code decorrelators 640, 645 will be referred to as $v$, where $v$ is defined by the following equation:

$$v=I_i+jQ_i.$$

In addition, since the output of the spread spectrum code decorrelators 640, 645 is the autocorrelation function of the spread spectrum codeword, $q$, then, in the absence of noise, the vector $v$ may also be defined by the following equation:

$$v=q*c,$$

where the symbol $*$ indicates convolution. It is noted that due to the nature of the autocorrelation function, the autocorrelation for a spread spectrum codeword having a length $n$, will have a length of $(2n-1)$.

Thus, in the illustrative embodiment, where the spread spectrum codeword is an eleven-chip Barker code, the Barker code autocorrelation of each codeword will have a length of 21 chips. Accordingly, when looking at the output of the spread spectrum code decorrelators 640, 645, three successive Barker codes will overlap. If the channel did not induce any distortion, the compounded output of the spread spectrum code decorrelators 640, 645, for three successive positive polarity Barker codes, each having their main lobe in the center chip position, would have the following sample values:

... –1 –1 –1 11 –1 –1 –1 –1 –1 –1 –1 –1 –1 11 –1 –1 –1 –1 –1 –1 –1 –1 –1 –1 11 –1 –1 –1 ...

Thus, where the training sequence consists of all ones, and there is no channel distortion, the output of the spread spectrum code decorrelators 640, 645, can be a expressed as a "Barker" matrix, $\beta$, defined to be:

$$\beta = \begin{pmatrix} 11 & -1 & -1 & \cdots & -1 \\ -1 & 11 & -1 & \cdots & -1 \\ -1 & -1 & 11 & \cdots & -1 \\ \vdots & & & & \vdots \\ -1 & -1 & -1 & \cdots & 11 \end{pmatrix}.$$

Of course, in an actual implementation, where the channel distorts the transmitted signal, the output, $v$, a vector, of the spread spectrum code decorrelators 640, 645, in the absence of noise, can be expressed as:

$$v=\beta c.$$

To obtain the estimate of the channel impulse response, $c$, the above equation can be rewritten as follows:

$$c=\beta^{-1}v.$$

The inverse Barker matrix, $\beta^{-1}$, can be readily evaluated and stored in a look-up table, thereby allowing the channel estimate to be calculated once the sampled outputs of the spread spectrum code decorrelators 640, 645, $v$, is obtained. For example, the inverse Barker matrix, $\beta^{-1}$, for a training sequence consisting of all positive polarity Barker codes, can be expressed as:

$$\beta^{-1} = \frac{1}{12} \begin{pmatrix} 2 & 1 & 1 & \cdots & 1 \\ 1 & 2 & 1 & \cdots & 1 \\ 1 & 1 & 2 & \cdots & 1 \\ \vdots & & & & \vdots \\ 1 & 1 & 1 & \cdots & 2 \end{pmatrix}.$$

Thus, when the training sequence is comprised of all positive polarity Barker codes, the channel estimate, $c$, can be expressed as:

$$c = \begin{pmatrix} c_0 \\ c_1 \\ c_2 \\ \vdots \\ c_{10} \end{pmatrix} = \frac{1}{12} \begin{pmatrix} 2 & 1 & 1 & \cdots & 1 \\ 1 & 2 & 1 & \cdots & 1 \\ 1 & 1 & 2 & \cdots & 1 \\ \vdots & & & & \vdots \\ 1 & 1 & 1 & \cdots & 2 \end{pmatrix} \begin{pmatrix} v_0 \\ v_1 \\ v_2 \\ \vdots \\ v_{10} \end{pmatrix}.$$

If the polarities of the three successive Barker codes are not all positive, then the signs of the main diagonal in the Barker matrix should be changed accordingly. For example, if three successive Barker codes having the following polarities were transmitted, namely, negative, positive, positive, then the compounded output of the spread spectrum code decorrelators 640, 645, in the absence of noise, for the three overlapping symbols, would have the following sample values:

... –1 +1 –1 +1 –1 +1 –1 +1 –1 +1 11 –1 –1 –1 –1 –1 –1 –1 –1 –1 ...

It is important to note from this output series that the even sidelobes will always have opposite polarity to the main lobe, regardless of the respective polarities of the three successive symbols.

In general, there are four possible cases when considering the possible polarity combinations of the three successive Barker codes. First, if the first and last symbols in the three successive symbols have the same polarity, and the center symbol has an opposite polarity, referred to as case 00, then all of the odd sidelobes will have an opposite polarity to the main lobe. Second, if the first symbol in the three successive symbols has an opposite polarity from the center and right symbol, referred to as case 0s, then the odd sidelobes on the left will have an opposite polarity to the main lobe, while the odd sidelobes on the right will have the same polarity as the main lobe. Third, if the third symbol in the three successive symbols has an opposite polarity from the center and left symbol, referred to as case s0, then the odd sidelobes on the left will have the same polarity as the main lobe, while the odd sidelobes on the right will have an opposite polarity to the main lobe. Finally, if all three symbols in the three successive symbols have the same polarity, referred to as case ss, then all of the odd sidelobes will have the same polarity as the main lobe.

Thus, there are four possible values for the Barker matrix, each corresponding to one of the possible polarity combinations of the three successive Barker codes, namely, $\beta^{(00)}$, $\beta^{(0s)}$, $\beta^{(s0)}$, and $\beta^{(ss)}$. Thus, the output equation for the output of the spread spectrum code decorrelators 640, 645, in the absence of noise, can be expressed as:

$$\beta^{(00)}c = v^{(00)};$$

$$\beta^{(0s)}c = v^{(0s)};$$

$$\beta^{(s0)}c = v^{(s0)};$$

$$\beta^{(ss)}c = v^{(ss)}.$$

Thus, as shown in FIG. 8, using knowledge of the predefined transmitted training sequence, the polarity of the current symbol, k, is compared against the polarity of the previous and subsequent symbols, during step 815 to identify the relative polarities of the three successive symbols. The relative polarities are utilized to classify the current three symbol sequence into one of the cases, 00, 0s, s0, ss, described above, in order to identify the appropriate inverse Barker matrix, $\beta^{-1}$, to utilize in the channel estimate calculation.

Thereafter, the appropriate inverse Barker matrix, $\beta^{-1}$, is multiplied by the vector, v(k), during step 820, to provide the channel impulse response for the current symbol, k, where v(k) is the sampled outputs of the spread spectrum code decorrelators 640, 645 for the current symbol duration. The channel impulse response for the current symbol, k, as calculated during step 820, is then added to the overall channel estimate, c, during step 825, in order to average the channel estimate over the entire training sequence.

A test is performed during step 840 to determine if the value of the training symbol counter, k, is greater than or equal to a variable, $K_T$, which is the predefined number of training symbols in each transmitted packet. If it is determined during step 840 that the value of the training symbol counter, k, is not greater than or equal to $K_T$, then the value of the symbol counter, k, will be incremented during step 845, and program control will return to step 815 to process the remaining training symbols in the current transmitted packet.

If, however, it is determined during step 840 that the value of the training symbol counter, k, is greater than or equal to $K_T$, then each of the training symbols in the current transmitted packet have been evaluated, and program control will proceed to step 860, where program execution will terminate.

As indicated above, the channel parameter estimator 650 preferably includes an autocorrelator 654 for calculating the autocorrelation, L(v), of the received sequence, g, where v is utilized here to indicate the chip position. As indicated above, the autocorrelation function, L(v), is used in calculating the bias correction terms, $B(l_a - l_b)$, and the trellis correction terms, $G(i(k+1), i(k))$.

Figure 9:
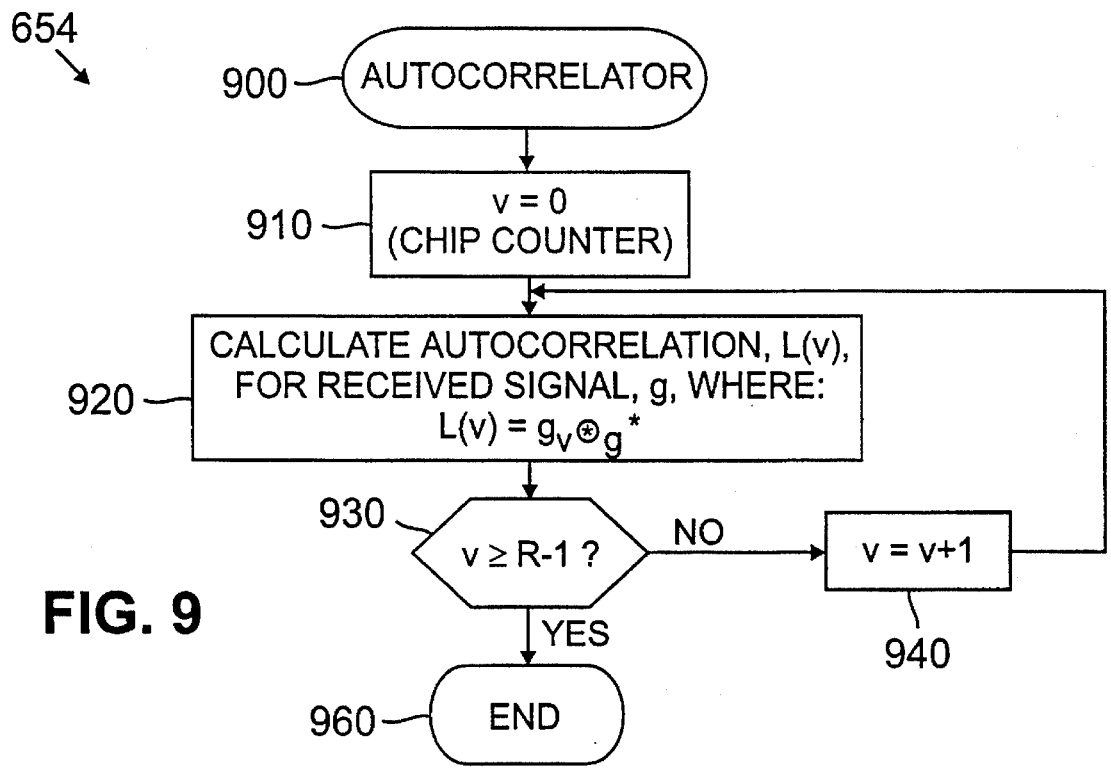
FIG. 9 is a flow chart describing an exemplary autocorrelator which may be utilized by the channel parameter estimator of FIG. 6 in calculating the autocorrelation of a transmitted signal pulse.

Although there are many well known techniques for calculating the autocorrelation of a received sequence, one preferred technique for calculating the autocorrelation function is illustrated in FIG. 9. As previously indicated, the autocorrelation function 654 is preferably calculated by the channel parameter estimator 650 during transmission of the training sequence for each transmitted packet.

It is noted that the received sequence, g, passes through two matched filters in the receiver 600, namely, the spread spectrum code decorrelators 640, 645, as well as the channel matched filter 660. The spread spectrum code decorrelators 640, 645, correlate the received sequence with the spread spectrum codeword, q(t), such as the Barker codeword. In addition, the channel matched filter 660 correlates the received sequence, g, with the estimate of the channel impulse response, c(t).

Thus, in a preferred embodiment, the autocorrelator 654 will account for both the spread spectrum code decorrelators 640, 645 and the channel matched filter 660. In one embodiment, discussed below, this is implemented by convolving the received sequence, g, with the conjugate of the received sequence, g*, which is the complex product of the conjugate of the transmitted spread spectrum codewords, q(t)*, and the conjugate of the channel impulse response, c(t)*. In this manner, the autocorrelator 654 serves as a compound matched filter, accounting for both the spread spectrum code decorrelators 640, 645 and the channel matched filter 660.

The autocorrelator 654 is entered during step 900, as shown in FIG. 9. Thereafter, a counter, v, is set to zero during step 910. As is well known, the autocorrelation function, L(v), will have a maximum value when the received sequence, g, and the coefficients of the compound matched filter are perfectly synchronized, namely, for L(0). The autocorrelation is preferably calculated for each separation distance between the received sequence and the compound matched filter coefficients, up to the length of the channel memory, R, in chip positions.

The autocorrelation function, L(v), is preferably calculated during step 920, according to the following equation:

$$L(v) = g_v \otimes g^*,$$

where ⊗ indicates the complex product and $g_v$ is g shifted right by v samples. For example, $$L(0) = g_1^* g_1 + g_2^* g_2 + \ldots + g_R^* g_R.$$

Similarly, $$L(1) = g_1^* g_2 + g_2^* g_3 + \ldots + g_{R-1}^* g_R.$$

It should be noted that L(−v) is the complex conjugate of L(v). Thus, L(v) need only be calculated for positive values of v. It is further noted that the autocorrelation function, L(v), is a complex function and may be expressed in terms of its real and imaginary components:

$$L(v) = Re\{L(v)\} + j\, Im\{L(v)\}.$$

This notation will be useful during the discussion which follows for the calculation of the bias correction terms, $B(l_a - l_b)$ and the trellis correction terms, $G(i(k+1), i(k))$.

Following calculation of the autocorrelation, L(v), during step 920, a test is performed during step 930 to determine if the value of the chip counter, v, is greater than or equal to the length of the memory, R−1. In other words, this test determines if there are additional chip positions to be tested within the memory, R, of the channel.

If it is determined during step 930 that the value of the chip counter, v, is not greater than or equal to R−1, then the value of the counter, v, will be incremented during step 940, and program control will return to step 920 to process the remaining chip positions within the channel memory. If, however, it is determined during step 930 that the value of the chip counter, v, is greater than or equal to R−1, then each of the chip positions within the channel memory have been evaluated, and program control will proceed to step 960, where execution of the autocorrelator 654 will terminate.

Conceptually, the autocorrelation function, L(v), would provide the output at the channel matched filter 660 if only a single spread spectrum codeword was transmitted on either the I or Q channel. It is noted that the autocorrelation function is a complex function. Thus, the real part of the autocorrelation function, Re{L(v)}, indicates the magnitude of the echo of the transmitted pulse, at a distance of v chip positions away from the location of the transmitted pulse on the same rail. The imaginary part of the autocorrelation function, Im{L(v))}, indicates the magnitude of the echo of the transmitted pulse, at a distance of v chip positions away from the location of the transmitted pulse on the opposite rail. As previously indicated, the echoes of a single pulse will be detected up to a distance, R, equal to the channel memory, away from the chip position of the transmitted pulse.

Since codewords, however, are preferably transmitted simultaneously during each symbol interval on both the I and Q channels, the output of the channel matched filter 660 will be the aggregate effect of the autocorrelation functions for each transmitted pulse.

AUTOCORRELATION WITH RESPECT TO ICI AND ISI

Figure 10A:
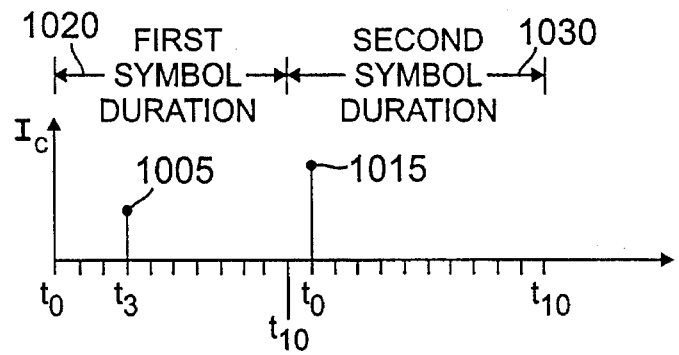
FIGS. 10a and 10b are graphical illustrations of the interchip and intersymbol interference of successive symbols transmitted in the I and Q channels of the receiver of FIG. 6.
Figure 10B:
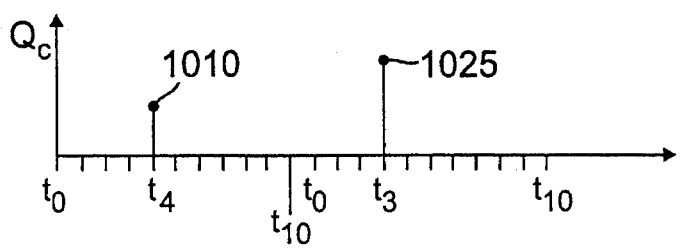

If, as illustrated in FIGS. 10a and 10b, a pulse 1005 is transmitted in the fourth chip position of the I channel during a first symbol interval 1020, the maximum value of the autocorrelation function, L(0), would be measured at a time, $t_3$, which corresponds to the fourth chip position of the first symbol 1020 on the I channel. In addition, due to the delay spread of the channel, echoes of the pulse 1005 will be measured up to a distance, R, the memory of the channel, away from the position of the pulse 1005. Thus, for each chip position, v, within the length of the channel memory, in other words, for each v that is less than R, a magnitude of L(v) will be measured, which is attributable to the echo from pulse 1005.

If a pulse 1010 is also transmitted in the fifth chip position of the Q channel during the first symbol interval 1020, the maximum value of the autocorrelation function, L(0), would be measured at a time, $t_4$, corresponding to the fifth chip position of the first symbol 1020 on the Q channel. In addition, echoes from the pulse 1010 will be measured up to a distance R away from the location of the pulse 1010.

However, due to interchip interference (ICI), the measured magnitudes of the pulses 1005 and 1010 are affected by the cross-rail influence of the I and Q channels on one another. Specifically, since the pulse 1005 on the I channel and the pulse 1010 on the Q channel are on opposite rails, and separated by a distance of one, the symmetric influence on one another will be the imaginary part of the autocorrelation function for a separation distance of one, namely, Im{L(1)}. Accordingly, in order to compensate for the cross-rail influence, this value should be subtracted from each of the measured magnitudes of the pulses 1005, 1010, in a manner described below in conjunction with FIG. 13. The calculation of the interchip interference correction terms, or the bias correction terms, $B(l_a-l_b)$, is discussed below in conjunction with FIG. 11.

If, in the next symbol interval 1030, a pulse 1015 is transmitted in the first chip position of the I channel, the maximum value of the autocorrelation function, L(0), would be measured at a time, $t_0$, corresponding to the first chip position of the second symbol. In addition, if a pulse 1025 is transmitted in the fourth chip position of the Q channel, the maximum value of the autocorrelation function, L(0), would be measured at a time, $t_3$, corresponding to the fourth chip position of the second symbol 1030.

However, the measured magnitude of the pulse 1015 in the first chip position of the second symbol 1030 will be influenced by the echoes from pulses 1005 and 1010 from the previous symbol 1020 due to intersymbol interference (ISI), as well as being influenced by the pulse 1025 on the Q channel due to ICI. Specifically, since the pulse 1015 and the pulse 1005 are on the same rail, and separated by a distance of eight chip positions, the ISI effect of pulse 1005 on pulse 1015 will be the real part of the autocorrelation function, L, for a separation distance of eight, namely, Re{L(8)}. In addition, since the pulse 1015 and the pulse 1010 are on opposite rails, and separated by a distance of eight chip positions, the ISI effect of pulse 1010 on pulse 1015 will be the imaginary part of the autocorrelation function, L, for a separation distance of seven, namely, Im{L(7)}. Accordingly, in order to compensate for the ISI effects on pulse 1015, these values are expressed in the trellis correction terms, G, and should be subtracted from the measured magnitude of the pulse 1015, in a manner described below in conjunction with FIGS. 15 through 16.

Since the pulse 1015 on the I channel and the pulse 1025 on the Q channel are on opposite rails, and separated by a distance of three chip positions, the ICI effect of pulse 1025 on pulse 1015 will be the imaginary part of the autocorrelation function for a separation distance of three, namely, Im{L(3)}. Accordingly, in order to compensate for the ICI effects on pulse 1015 from pulse 1025, this value is expressed in the bias correction term and should be subtracted from the measured magnitude of the pulse 1015, in a manner described below in conjunction with FIG. 13.

CALCULATION OF ICI AND ISI CORRECTION TERMS

As previously indicated, the channel parameter estimator 650 includes a bias term calculator 656 for calculating the bias correction terms, $B(l_a-l_b)$, which compensates for the cross-rail influence of the I and Q signals for a given symbol duration on one another. The imaginary part of the autocorrelation function, Im{L(v))}, indicates the magnitude of the echo of a transmitted pulse, at a distance of v chip positions away from the location of the transmitted pulse on the opposite rail. Since the interchip interference correction terms, $B(l_a-l_b)$, compensate for the cross-rail influence of the I and Q pulses on one another within a given symbol duration, the bias terms, $B(l_a-l_b)$, need only be calculated for the valid positions of the main lobe, namely, chip positions one through eight in the illustrative embodiment.

Figure 11:
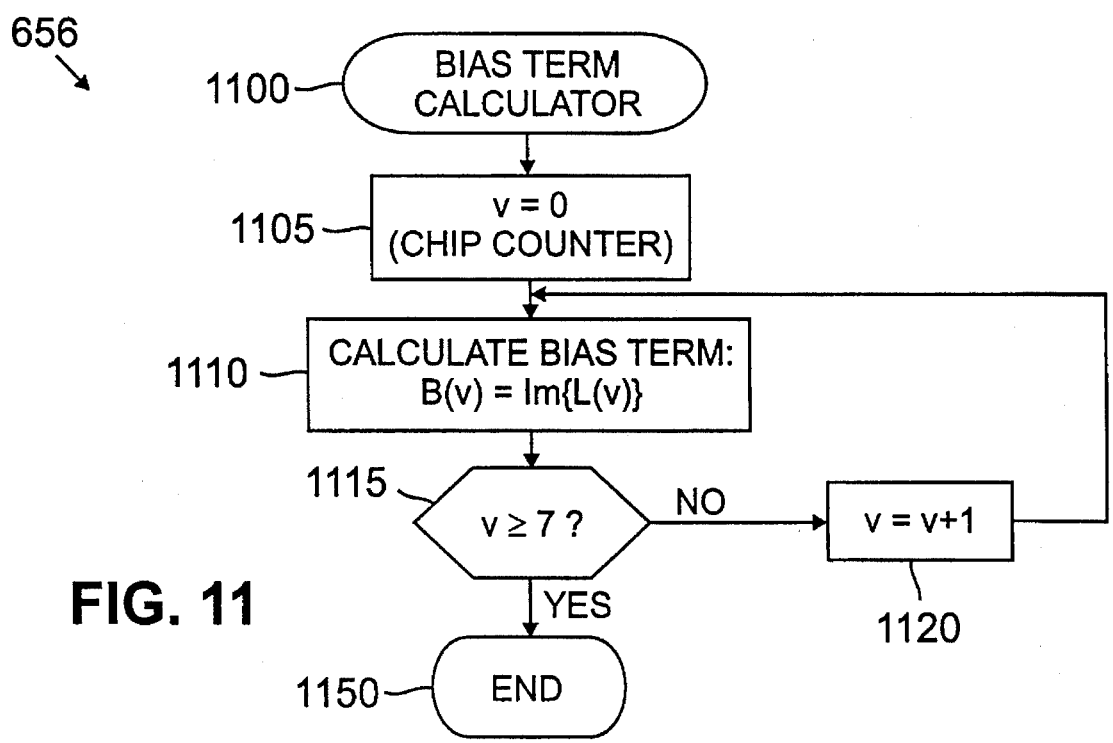
FIG. 11 is a flow chart describing an exemplary bias term calculator which may be utilized by the channel parameter estimator of FIG. 6 in calculating the bias correction terms, $B(l_a-l_b)$.

As shown in FIG. 11, the bias term calculator 656 will be entered at step 1100. Thereafter, a counter, v, will be initialized to zero during step 1105. The counter, v, will be utilized to step through each of the eight valid chip positions for the main lobe.

The bias correction terms, $B(l_a-l_b)$, or $B(v)$, are preferably calculated during step 1110, according to the following equation:

$$B(v) = Im\{L(v)\},$$

where $L(v)$ is the complex autocorrelation function calculated in the manner described above. It should be noted that $B(-v)$ is the negative of $B(v)$; thus, $B(-v)=-B(v)$. Thus, $B(v)$ need only be calculated for positive values of $v$.

A test is performed during step 1115 to determine if the value of the chip counter, $v$, is greater than or equal to seven, in other words, if there are additional valid chip positions to be evaluated.

If it is determined during step 1115 that the value of the chip counter, $v$, is not greater than or equal to seven, then the value of the counter, $v$, will be incremented during step 1120, and program control will return to step 1110 to process the remaining valid chip positions. If, however, it is determined during step 1115 that the value of the chip counter, $v$, is greater than or equal to seven, then each of the valid chip positions have been evaluated, and program control will proceed to step 1150, where execution of the bias term calculator 656 will terminate.

As previously indicated, the bias terms are preferably calculated in the manner just described by the channel parameter estimator 650 during transmission of the training sequence for each transmitted packet.

As indicated above, the channel parameter estimator 650 preferably also includes a trellis correction term calculator 658 for calculating the trellis correction terms, $G(i(k+1), i(k))$, which are utilized by the mode sifter 680 to compensate for the intersymbol interference. In the illustrative embodiment, the channel memory is one symbol duration. Thus, a given symbol may only be influenced by an adjacent symbol. In other words, the trellis correction terms, $G(i(k+1), i(k))$, quantify the influence on the symbol $i(k+1)$ of the previous symbol, $i(k)$.

Thus, as discussed below, the trellis correction terms, G, will have four elements, namely, the effect of the I component of the symbol, $i(k)$, on the I component of the following symbol $i(k+1)$, the effect of the I component of the symbol, $i(k)$, on the Q component of the following symbol $i(k+1)$, the effect of the Q component of the symbol, $i(k)$, on the Q component of the following symbol $i(k+1)$, and the effect of the Q component of the symbol, $i(k)$, on the I component of the following symbol $i(k+1)$.

Each of the four elements of the trellis correction terms, G, will be derived from the autocorrelation function, $L(v)$, in a manner described below. Since two of the elements quantify a cross-rail influence, namely, the effect of an I component on the Q component of the following symbol, or a Q component on the I component of the following symbol, they will be defined by the imaginary part of the autocorrelation function. Similarly, since the remaining two elements quantify the influence along the same rail of an I component on the I component of the following symbol, or the Q component on the Q component of the following symbol, they will be defined by the real part of the autocorrelation function.

Figure 12:
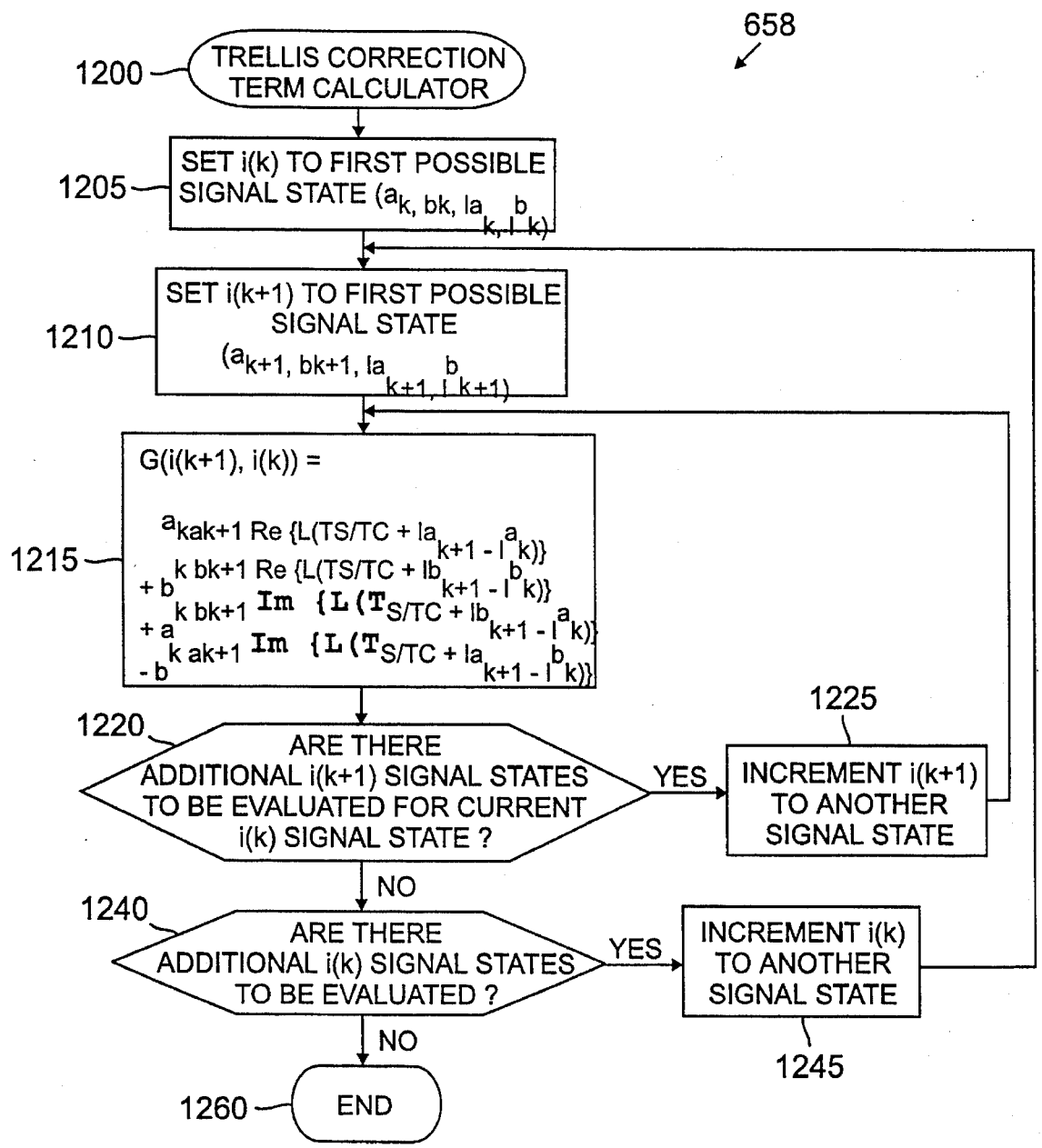
FIG. 12 is a flow chart describing an exemplary trellis correction term calculator which may be utilized by the channel parameter estimator of FIG. 6 in calculating the trellis correction terms, $G(i(k+1), i(k))$.

As shown in FIG. 12, the trellis correction term calculator 658 will be entered at step 1200. The trellis correction term calculator 658 will utilize the autocorrelation function, $L(v)$, to assign a trellis correction term, G, for each possible combination of symbol $i(k+1)$ and symbol $i(k)$. In the illustrative embodiment, each symbol, $i(k)$, defined by $(a, b, l_a$ and $l_b)$, represents 256 possible signal states. Thus, for two successive symbols, $i(k+1)$ and $i(k)$, there are $256^2$ possible combinations.

The trellis correction term calculator 658 will initially set $i(k)$ to a first possible signal state, $(a, b, l_a$ and $l_b)$, during step 1205, and will then proceed to evaluate each possible signal state, $i(k+1)$, for the following symbol during steps 1210 through 1225. The trellis correction term calculator 658 will set $i(k+1)$ to a first possible signal state, $(a_{k+1}, b_{k+1}, l_{a_{k+1}}, l_{b_{k+1}})$, during step 1210.

Thereafter, the trellis correction term, $G(i(k+1), i(k))$, will be calculated during step 1215 for the current values of $i(k+1)$ and $i(k)$, namely, for $i(k+1)$ equal to $a_{k+1}, b_{k+1}, l_{a_{k+1}}$ and $l_{b_{k+1}}$ and $i(k)$ equal to $a_k, b_k, l_{a_k}$ and $l_{b_k}$. The trellis correction terms, $G(i(k+1), i(k))$, are calculated according to the following equation:

$$G(i(k+1),i(k)) = a_k a_{k+1} Re\{L(T_S/T_C + l_{a_{k+1}} - l_{a_k})\} + \\ b_k b_{k+1} Re\{L(T_S/T_C + l_{b_{k+1}} - l_{b_k})\} + \\ a_k a_{k+1} Im\{L(T_S/T_C + l_{b_{k+1}} - l_{a_k})\} - \\ b_k a_{k+1} Im\{L(T_S/T_C + l_{a_{k+1}} - l_{b_k})\}$$

where each term in the form $(T_S/T_C+l_2-l_2)$ indicates the distance between the pulses in adjacent symbols.

Thereafter, a test is performed during step 1220 to determine if there are additional signal states, $(a_{k+1}, b_{k+1}, l_{a_{k+1}}$ and $l_{b_{k+1}})$, to be evaluated for $i(k+1)$, for the current setting of $i(k)$. If it is determined during step 1220 that there are additional signal states to be evaluated for $i(k+1)$, then $i(k+1)$ will be incremented to another signal state during step 1225. Thereafter, program control will return to step 1215 to process the remaining signal states in the manner described above.

If, however, it is determined during step 1220 that there are no remaining signal states to be evaluated for $i(k+1)$ for the current $i(k)$ signal state, then a test is performed during step 1240 to determine if there are additional $i(k)$ signal states, $(a_k, b_k, l_{a_k}$ and $l_{b_k})$, to be evaluated. If it is determined during step 1240 that there are additional signal states to be evaluated for $i(k)$, then $i(k)$ will be incremented to another signal state during step 1245. Thereafter, program control will return to step 1210 to process the remaining signal states in the manner described above.

If, however, it is determined during step 1240 that there are no remaining signal states to be evaluated for $i(k)$, then program execution will terminate during step 1260.

As previously indicated, the trellis correction terms are preferably calculated by the channel parameter estimator 650 during transmission of the training sequence for each transmitted packet.

STATE INDEPENDENT TENTATIVE SYMBOL ESTIMATION

Figure 13:
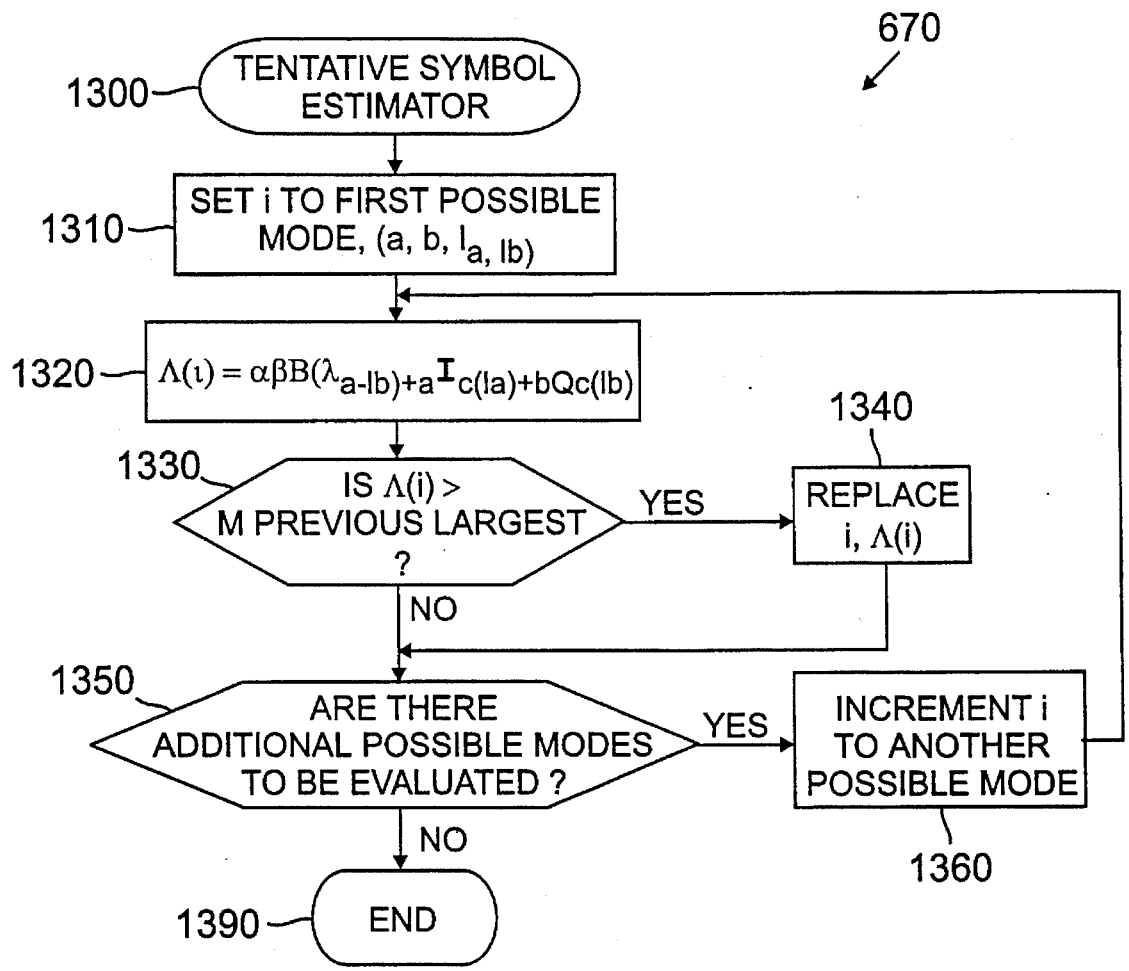
FIG. 13 is a flow chart describing an exemplary implementation of the tentative symbol estimator of FIG. 6.

The tentative symbol estimator 670, illustrated in flow chart form in FIG. 13, will evaluate the likelihood of each of the 256 possible signal states, or modes, for a particular symbol, $i$, and assign a weight to each mode. As discussed below, the weight assigned to each mode is based upon two factors, namely, the matched filter data values, $I_c$ and $Q_c$, measured for the respective symbol, and the precomputed bias terms, $B(l_a-l_b)$. In the illustrative embodiment, the four highest weighted modes will be maintained and are referred to as the multimodal estimates or retained states.

The tentative symbol estimator 670 will initially set i to a first possible mode, or signal state, (a, b, $l_a$ and $l_b$), during step 1310. Thereafter, during step 1320, the tentative symbol estimator 670 will evaluate the weight, $\Lambda(i)$, of the current mode, i, according to the following equation:

$$\Lambda(i) = abB(l_a - l_b) + aI_c(l_a) + bQ_c(l_b).$$

The tentative symbol estimator 670 will perform a test during step 1330 to determine if the weight, $\Lambda$, of the current mode, i, is one of the M previous largest, where M is the number of modes or states retained for each symbol estimate. It is noted that in the illustrative embodiment, M is equal to four. If it is determined during step 1330 that the weight, $\Lambda$, calculated during step 1320 is one of the M previous largest, then the current mode, i, and its associated weight, $\Lambda$, are stored during step 1340. In this manner, the M modes having the highest weights will be retained.

A test is then performed during step 1350 to determine if there are additional possible modes or signal states, (a, b, $l_a$, $l_b$), to be evaluated for the current symbol. If it is determined during step 1350 that there are additional possible modes or signal states to be evaluated, i will be incremented to another possible mode, (a, b, $l_a$, $l_b$), during step 1360. Thereafter, program control will return to step 1320 to process the remaining modes in the manner described above.

If, however, it is determined during step 1350 that there are no additional modes to be evaluated, program control will terminate during step 1390.

MODE SIFTING OF RETAINED STATES

Figure 14:
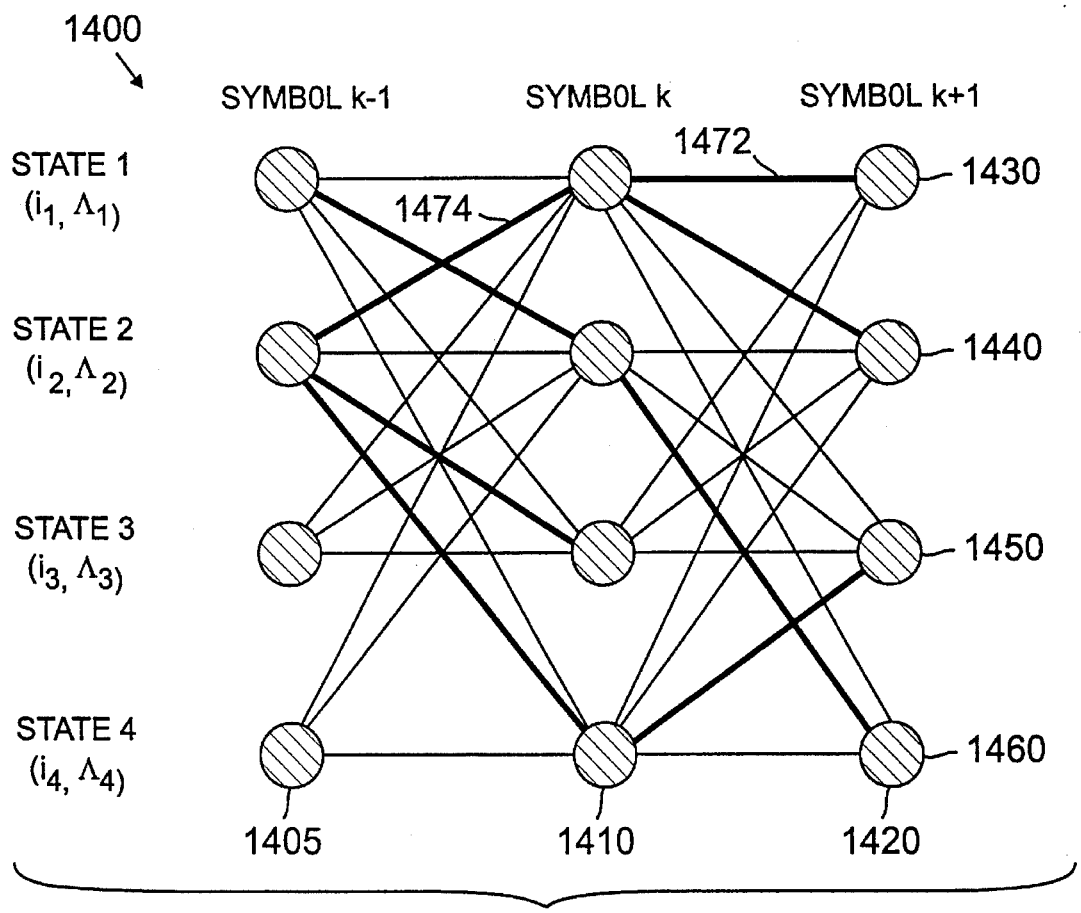
FIG. 14 is a graphical illustration of a trellis comprised of the retained states for each transmitted symbol.

FIG. 14 illustrates the trellis 1400 that results from the M states or modes, such as the four retained states in the illustrative embodiment, that are retained by the tentative symbol estimator 670 for each symbol. The trellis 1400 is comprised of a plurality of rows, such as the rows 1430, 1440, 1450 and 1460, each corresponding to a retained state. In addition, the trellis 1400 includes a plurality of columns, such as the columns 1405, 1410, and 1420, each corresponding to a particular symbol interval. As discussed further below, the mode sifter 680 will evaluate each retained state for a particular symbol, and select the state from the previous symbol having the greatest weight, indicating the most likely path through the trellis 1400 to that state of the current symbol. The bold lines in FIG. 14, such as the lines 1472 and 1474, represent a pointer back to the state of the previous symbol having the greatest weight.

Figure 17:
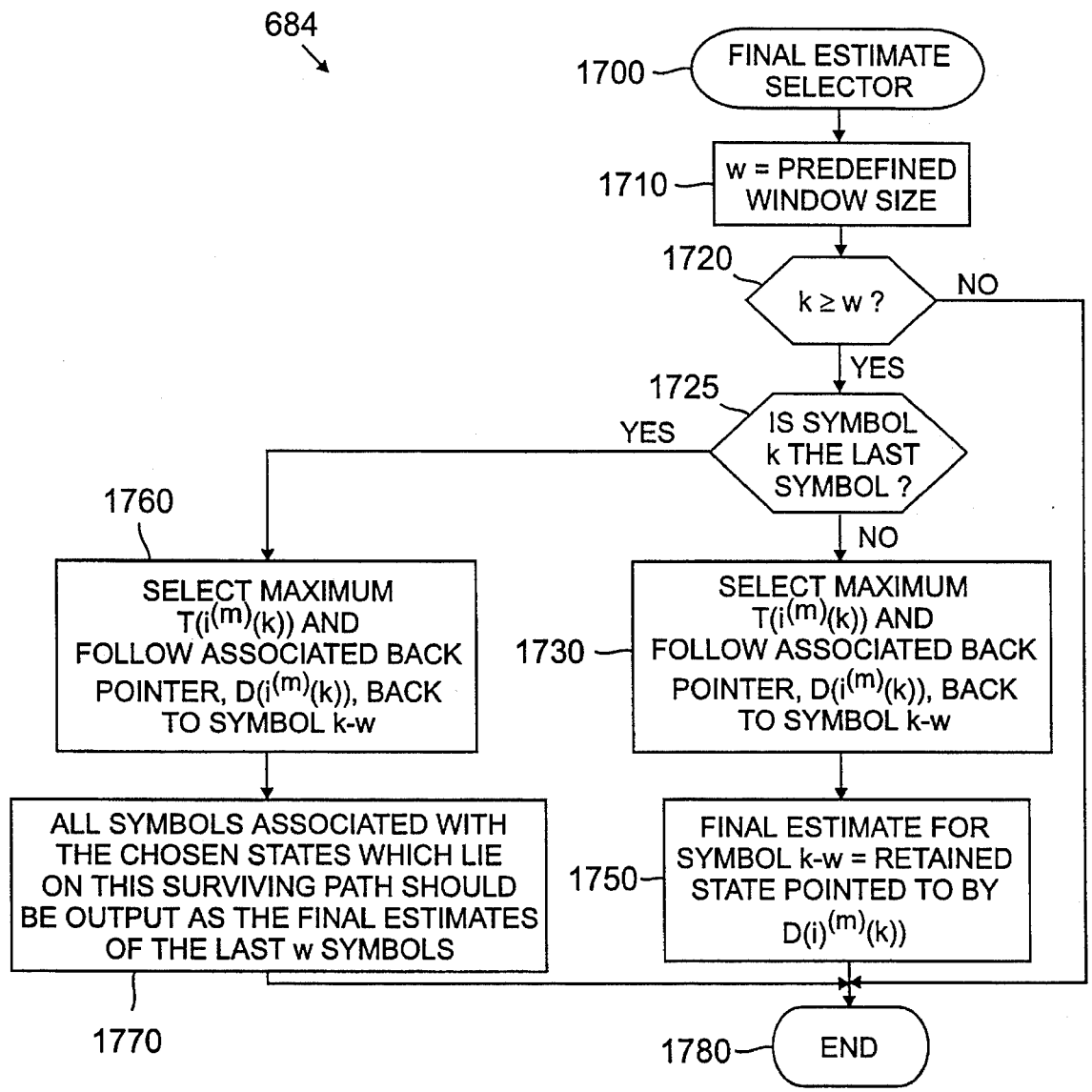
FIG. 17 is a flow chart describing an exemplary final estimate selector which may be utilized by the mode sifter of FIG. 6 in identifying the final estimate of each transmitted symbol.

As discussed further below in conjunction with FIG. 17, the mode sifter 680 will wait for a predefined window period before making a determination about the final estimate of any symbol. Thus, the mode sifter 680 will preferably utilize a window size of several symbols before making a determination about the final estimate of a symbol. The actual determination of the window size depends on the length, in symbol periods, of the channel memory, on the desired performance, and on the resulting complexity.

If, for example, a window size of two symbols was utilized, the mode sifter 680 could make a determination about the symbol i(k−1) 1405, shown in FIG. 14, after the symbol i(k+1) 1420 has been processed. As discussed below in conjunction with FIG. 17, the mode sifter 680 will select the state of symbol i(k+1) 1420 having the greatest accumulated path weight, discussed below, and then trace that path back to select the state of symbol i(k−1) 1405. For example, if the mode sifter 680 determines that state 1 of symbol i(k+1) has the greatest accumulated path weight, the mode sifter 680 will utilize the back pointers 1472 and 1474 to identify state 2 of symbol i(k−1) 1405 as the final estimate for symbol k−1.

Figure 15:
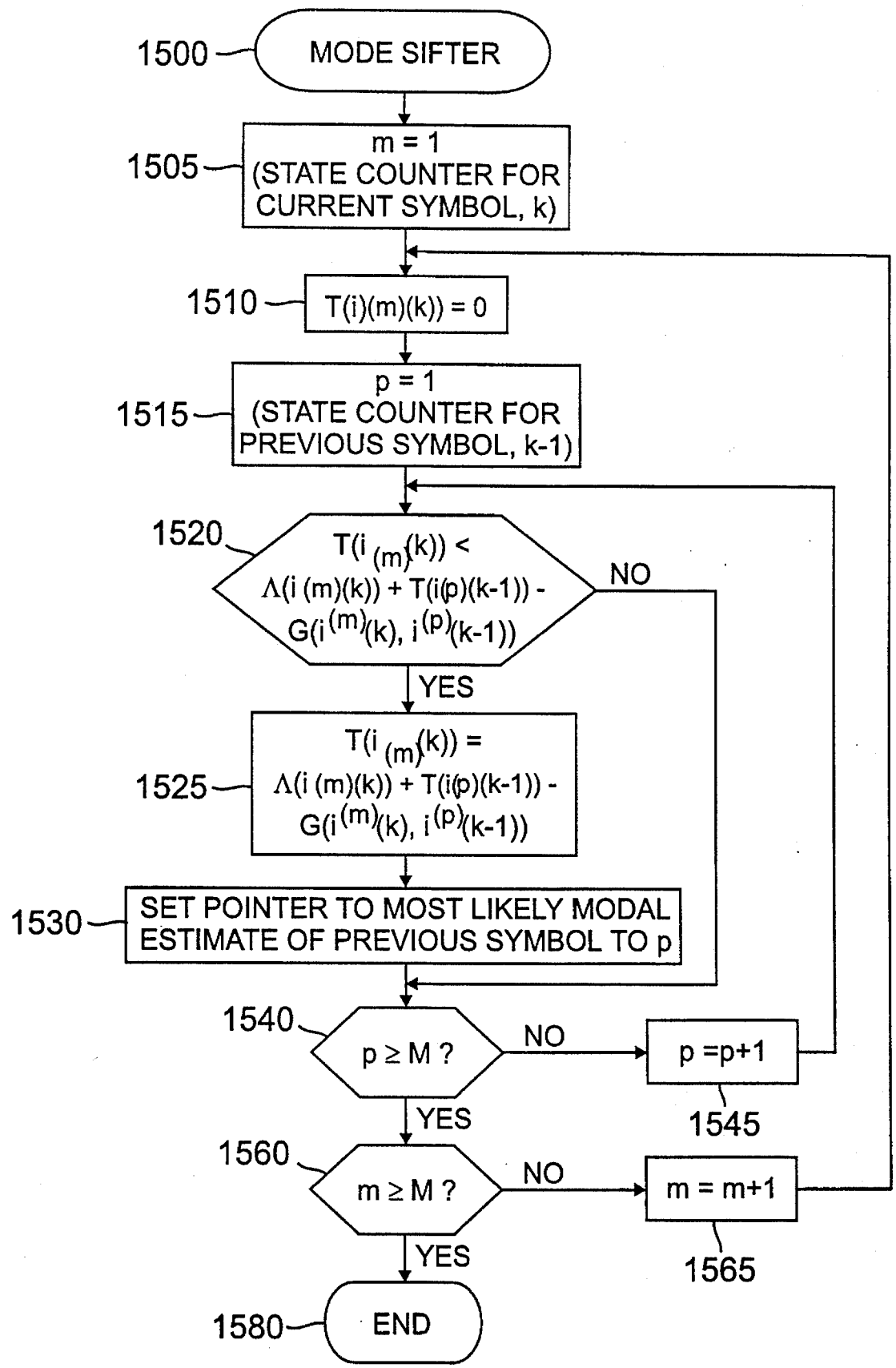
FIG. 15 is a flow chart describing an exemplary implementation of the mode sifter of FIG. 6.

The mode sifter 680, illustrated in flow chart form in FIG. 15, will evaluate the weighted values for each symbol estimate, as determined by the tentative symbol estimator 670, and assign final estimates to each symbol value. As discussed below, the mode sifter 680 will compensate for intersymbol interference by taking into account the calculated influence, G(i(k+1), i(k)), of adjacent symbols on one another.

In the discussion which follows, the accumulated path weight, T, is expressed in the form, $T(i^{(m)}(k))$, indicating the accumulated path weight of a path through the trellis 1400 up to and including a particular state, m, for a particular symbol, k.

As discussed below, a new path weight, $T(i^{(m)}(k))$, is calculated for each retained state, m, for a particular symbol, k, which quantifies the likelihood that a particular path through the trellis 1400 to that state, m, identifies the proper estimate for each symbol along the path. The path weight, $T(i^{(m)}(k))$, for a particular state, m, of a symbol, k, is based upon the accumulated weight, $T(i^{(m)}(k-1))$, of the path up to and including the previous symbol, k−1, plus the weight, $\Lambda(i^{(m)}(k))$, of the current state and symbol. In addition, in order to compensate for intersymbol interference, the path weight, $T(i^{(m)}(k))$, takes into account the influence, $G(i^{(m)}(k), i^{(p)}(k-1))$, on the $m^{th}$ modal estimate of the current (k) symbol, $i^{(m)}(k)$, that is attributable to the $p^{th}$ modal estimate of the previous symbol, $i^{(p)}(k-1)$.

As shown in FIG. 15, the mode sifter 680 is entered at step 1500. Thereafter, a counter, m, is initialized to one. The counter, m, will be utilized to step through each retained state for a particular symbol, k. The accumulated path weight for the current state and symbol, $T(i^{(m)}(k))$, is then initialized to zero during step 1510.

A counter, p, is initialized to one during step 1515. The counter, p, is utilized to step through each of the retained states of the previous symbol, k−1, for the current state, m, of the current symbol, k. The mode sifter 680 will then select the path from the retained states of the previous symbol, k−1, which yields the greatest weight for the current state, m, of symbol, k, during steps 1520 through 1545.

Specifically, a test is performed during step 1520 to determine if the current estimate of the accumulated path weight value, $T(i^{(m)}(k))$, currently stored for the current state, m, of symbol, k, is less than the accumulated weight of a path through the current state, p, of the previous symbol, k−1, to the current state, m, of symbol, k, which is defined by:

$$\Lambda(i^{(m)}(k)) + T(i^{(p)}(k-1)) - G(i^{(m)}(k), (i^{(p)})(k-1)).$$

As indicated above, the first element of this equation, $\Lambda$, quantifies the weight of the current state and symbol, the second element, T, quantifies the accumulated path weight of the path through state, p, of the previous symbol, k−1, and the final element, G, accounts for ISI and quantifies the influence on symbol, k, of symbol, k−1, if symbol k had a value equal to state m and symbol k−1 had a value equal to state p. It is noted that for the first received symbol, where k is equal to one, there are no previous symbols. Thus, there can be no ISI, and the concept of an accumulated surviving path weight is not relevant. Accordingly, where k is equal to one, both the input accumulated path weight, T, and the trellis correction terms, G, are zero.

If it is determined during step 1520 that the current estimate of the accumulated path weight value, $T(i^{(m)}(k))$, currently stored for the current state, m, of symbol, k, is less than the accumulated weight of a path through the current state, p, of the previous symbol, k−1, to the current state, m, of symbol, k, then the current estimate of the accumulated path weight value, $T(i^{(m)}(k))$, currently stored for the current state, m, of symbol, k, is replaced with the newly calculated accumulated path weight during step 1525. In addition, an indication of the current value of p is stored as the current estimate of the pointer to the most likely modal estimate of the previous symbol during step 1530.

If, however, it is determined during step 1520 that the current estimate of the accumulated path weight value, $T(i^{(m)}(k))$, currently stored for the current state, m, of symbol, k, is greater than the accumulated weight of a path through the current state, p, of the previous symbol, k−1, then program control will proceed to step 1540. A test is performed during step 1540 to determine if the value of the counter, p, is greater than M, the number of retained states for each symbol. In other words, whether there are additional states from the previous symbol to be evaluated for the current state, m, of the current symbol, k.

If it is determined during step 1540 that there are additional states from the previous symbol to be evaluated, the value of the counter, p, is incremented during step 1545, and program control will return to step 1520 to process the remaining states in the manner described above. If, however, it is determined during step 1540 that there are no additional states from the previous symbol to be evaluated, then program control will proceed to step 1560.

In this manner, following execution of steps 1520 through 1545, the accumulated path weight value, $T(i^{(m)}(k))$, stored for the current state, m, of symbol, k, will be for the path through the previous symbol, k−1, to the current state and symbol which provides the maximum path weight.

A test is performed during step 1560 to determine if the value of the counter, m, is greater than M, the number of retained states. In other words, whether there are additional states from the current symbol to be evaluated. If it is determined during step 1560 that there are additional states from the current symbol to be evaluated, the value of the counter, m, is incremented during step 1565, and program control will return to step 1510 to process the remaining states in the manner described above.

If, however, it is determined during step 1560 that there are no additional states from the current symbol to be evaluated, then program execution will terminate during step 1580.

Figure 16A:
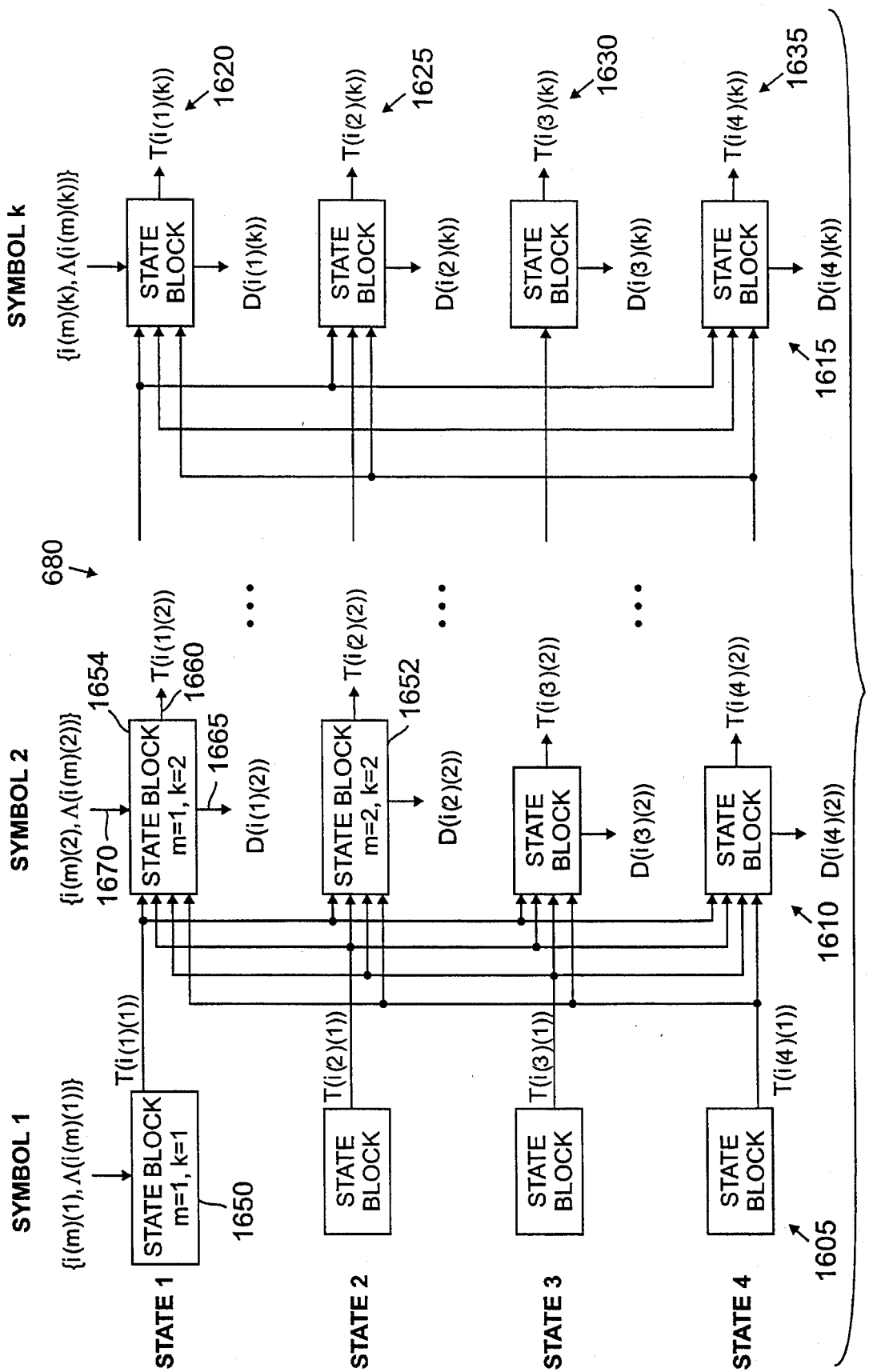
FIG. 16a is a schematic block diagram illustrating an alternative implementation of the mode sifter of FIG. 6.

An alternate embodiment of the mode sifter 680 is illustrated in schematic block diagram form in FIG. 16a. This implementation of the mode sifter 680 is comprised of a plurality of state blocks, discussed below, such as the state blocks 1650, 1652 and 1654. The state blocks, such as the blocks 1650–1654, are arranged into a plurality of rows, such as the rows 1620, 1625, 1630 and 1635, each associated with a particular state of each symbol. In addition, the mode sifter 680 is comprised of a plurality of columns, such as the columns 1605, 1610, and 1615, each associated with a particular symbol.

Each state block, such as the blocks 1650–1654, will receive the respective state, i(k), defined by (a, b, $l_a$ and $l_b$), and the corresponding weight, Λ, of the state, as calculated by the tentative symbol estimator 670, in the manner described above, by means of a data link, such as the data link 1670. In addition, each state block, such as the blocks 1650–1654, will receive the accumulated path weight, $T(i^{(m)}(k-1))$, and state value, $i^{(m)}(k-1)$, from each retained state of the previous symbol, by means of a data link, such as the data link 1660.

Figure 16B:
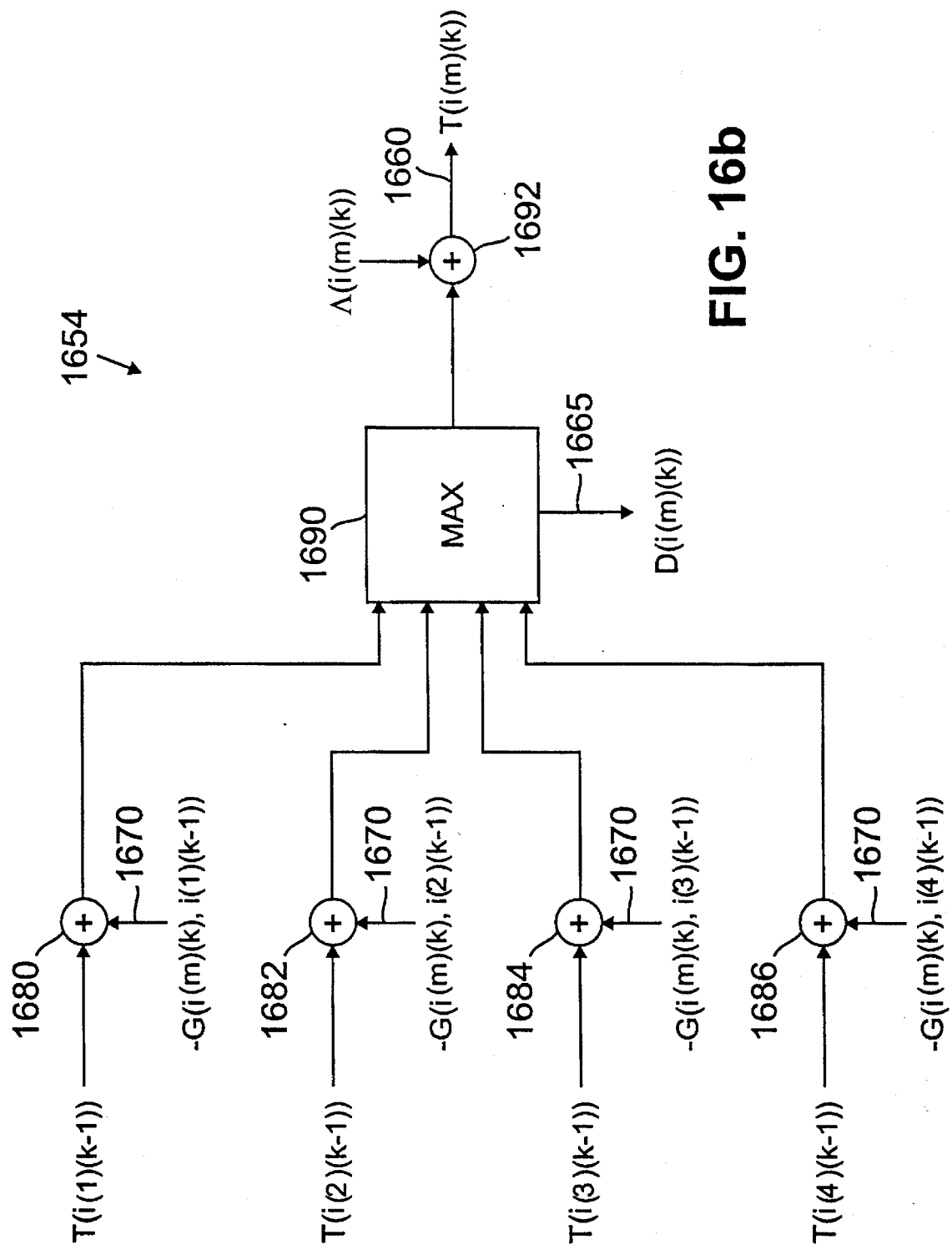

The logic of a suitable implementation of a state block, such as the block 1654, is illustrated in greater detail in FIG. 16b. As previously indicated, each state block, such as the block 1654, will receive the accumulated path weights, $T(i^{(m)}(k-1))$, and state values, $i^{(m)}(k-1)$, for each of the four retained states from the previous symbol, k−1. In addition, each state block, such as the block 1650, will receive the respective state, i(k), defined by (a, b, $l_a$ and $l_b$), and the corresponding weight, Λ, of the current state and symbol, from the tentative symbol estimator 670.

Each state block, such as the block 1654, will calculate the new accumulated path weight, $T(i^{(m)}(k))$, associated with block m of the current symbol, k, according to the following equation:

$$T(i^{(m)}(k)) = \Lambda(i^{(m)}(k)) + T(i^{(p)}(k-1)) - G(i^{(m)}(k), (i^{(p)})(k-1)),$$

where p is a counter indicating a particular state of the previous symbol, k−1. It is noted that the value of $G(i^{(m)}(k), (i^{(p)})(k-1))$, may be retrieved from a look-up table, created by the channel parameter estimator 650 during the preamble processing, or generated on the fly, based upon the respective state values of symbol k and symbol k−1. Since the weight, $\Lambda(i^{(m)}(k))$, of the current block m of the current symbol, k, is a constant in the above equation, and has been previously calculated by the tentative symbol estimator 670, the equation may be rewritten as:

$$T(i^{(m)}(k)) = \Lambda(i^{(m)}(k)) + \max\{T(i^{(p)}(k-1)) - G(i^{(m)}(k), (i^{(p)})(k-1))\},$$

where the variable p indicates each of the retained states of the previous symbol.

Thus, the equivalent logic is shown in FIG. 16b. Each adder, such as the adders 1680, 1682, 1684 and 1686, will calculate the term $\{T(i^{(p)}(k-1)) - G(i^{(m)}(k), (i^{(p)})(k-1))\}$, based upon the respective values from the associated state, p, from the previous symbol, k−1. For example, the adder 1680 will receive the accumulated path weight, $T(i^{(0)})(k-1))$, associated with state 1 from the previous symbol, k−1, and subtract the appropriate trellis correction term, namely, the influence on the current state, $i^{(m)}(k)$, of the current symbol, k, if the previous symbol was $i^{(0)}(k-1)$.

Thereafter, a maximum input selector 1690 will receive the values generated by each adder 1680–1686 and identify the maximum value. The maximum input selector 1690 will establish a pointer, $D(i^{(m)}(k))$, back to the state, p, of the previous symbol, k−1, having the maximum weight. In addition, the new accumulated path weight, $T(i^{(m)}(k))$, will be calculated by an adder 1692 by summing the identified maximum value at the output of the maximum input selector 1690, with the weight, $\Lambda(i^{(m)}(k))$, of the current state, m, of the current symbol, k. The new accumulated path weight, $T(i^{(m)}(k))$, will be passed to the next stage of the trellis by means of data link 1660.

As previously indicated, the mode sifter 680 includes a final estimate selector 684, to assign the final estimates to each symbol value. An illustrative final estimate selector 684, shown in FIG. 17, will be entered at step 1700. The final estimate selector 684 will define a variable, w, equal to the predefined trellis window size. As indicated above, the predefined window size has a value of five in the illustrative embodiment.

A test is performed during step 1720 to determine if the value of the current symbol, k, is greater than or equal to the value of w. If it is determined during step 1720 that the value of k is not greater than or equal to w, then enough symbols have not yet been received to make a determination as to the value of any symbol. Accordingly, program control will proceed to step 1780, where execution will terminate.

If, however, it is determined during step 1720 that the value of k is greater than or equal to w, then a test is performed during step 1725 to determine if the current symbol k is the last symbol. If it is determined during step 1725 that the current symbol k is not the last symbol, then the final estimate selector 684 will select the state, m, of the current symbol, k, having the maximum accumulated path weight, $T(i^{(m)}(k))$, during step 1730. In addition, the final estimate selector will utilize the back pointer, $D(i^{(m)}(k))$, associated with the selected state, m, of the current symbol, k, to trace the indicated path back to symbol k–w.

Thereafter, the final estimate for symbol k–w will be assigned during step 1750 to the value associated with the retained state, m, of symbol k–w, that is pointed to by the series of back pointers, D.

If, however, it is determined during step 1725 that the current symbol k is the last symbol, then the final estimate selector 684 will select the state, m, of the current symbol, k, having the maximum accumulated path weight, $T(i^{(m)}(k))$, during step 1760. In addition, the final estimate selector will utilize the back pointer, $D(i^{(m)}(k))$, associated with the selected state, m, of the current symbol, k, to trace the indicated path back to symbol k–w. Thereafter, during step 1770, all symbols associated with the chosen states which lie on the surviving path should be output as the final estimates of the last w symbols. Finally, program control will terminate during step 1780.

STATE DEPENDENT PROCESSING

In an alternate embodiment, particularly suitable for environments exhibiting high delay spread conditions, the effect of intersymbol interference can be taken into account in the tentative symbol estimation stage, before any potential states or modes are discarded. In this manner, the probability that the true state is included in one of the M retained states is significantly increased.

Figure 18:
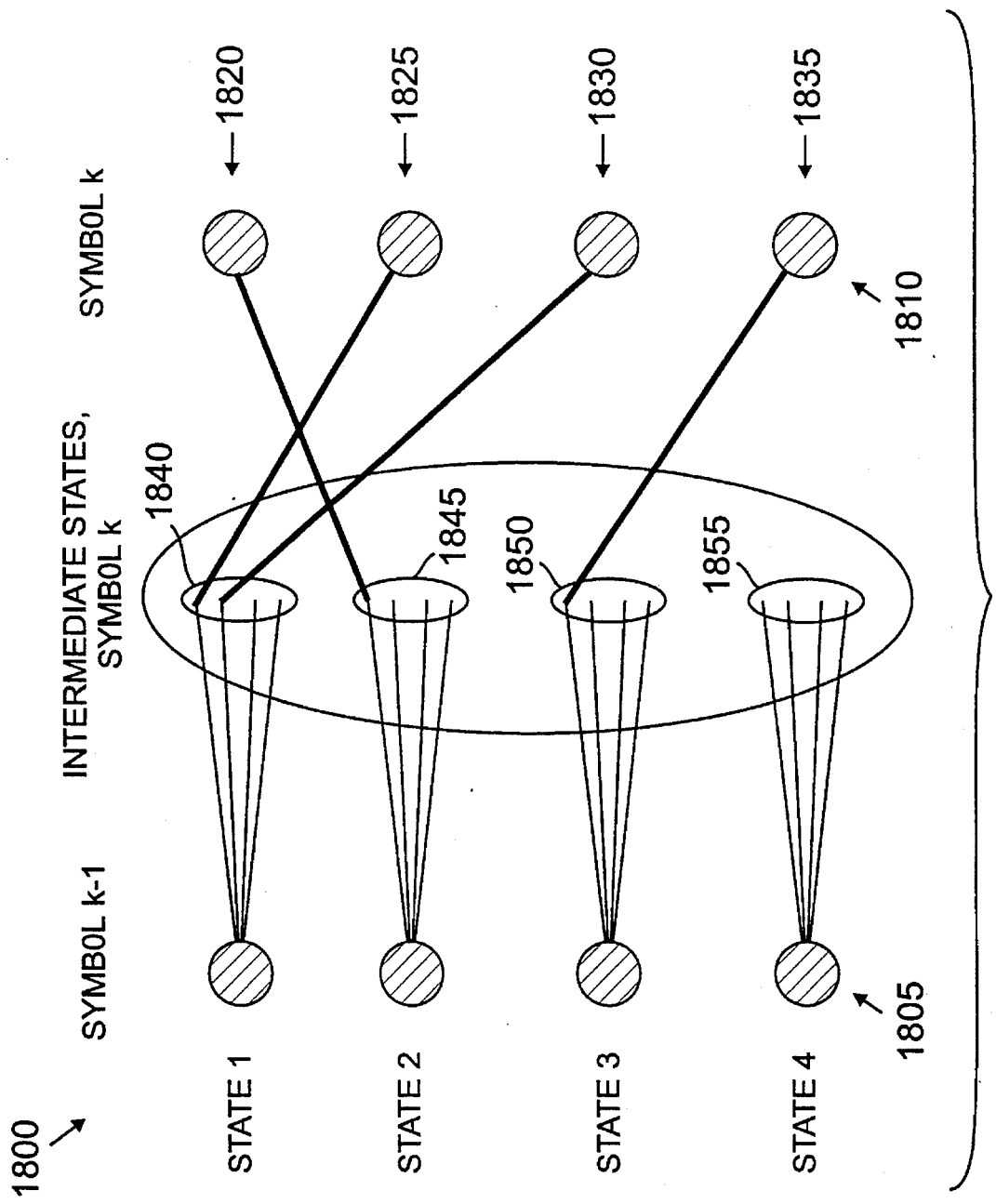
FIG. 18 is a graphical illustration of an alternative trellis comprised of the retained states for each transmitted symbol in accordance with the alternative tentative symbol estimator and mode sifter of FIGS. 19 and 20, respectively.

As shown conceptually in FIG. 18, an alternative trellis arrangement 1800 includes a plurality of m intermediate states, such as the states 1840, 1845, 1850 and 1855, associated with each symbol, k. A given symbol, k, will have one associated intermediate state, such as the state 1840, for each retained state from the previous symbol, k–1. As discussed below in conjunction with FIG. 19, the intermediate states, such as the state 1840, are generated by an alternative embodiment of the tentative symbol estimator 670. For each intermediate state, such as the state 1840, the tentative symbol estimator 670 will evaluate each possible value of symbol k and determine the likelihood that symbol k would have a particular value, given the value of the previous symbol, k–1, associated with a particular state. As discussed below, the alternative tentative symbol estimator 670 will take the influence, G, of intersymbol interference, into account when evaluating the weight of each potential value.

In this manner, the intersymbol interference effect is evaluated before any potential state values are discarded. The M possible values of state m of symbol k having the greatest likelihood will be retained for each intermediate state, such as the state 1840. Thus, in the illustrative embodiment, the set of intermediate states 1840, 1845, 1850, 1855, will be comprised of a total of 16 retained states, with four retained states for each intermediate state. As discussed below in conjunction with FIG. 20, an alternative implementation of the mode sifter 680 will evaluate the 16 retained states and select the four states that would be the most likely values for symbol k. It is noted that the four states selected as the most likely values for symbol k may all come from the same intermediate state, such as the state 1840.

Figure 19:
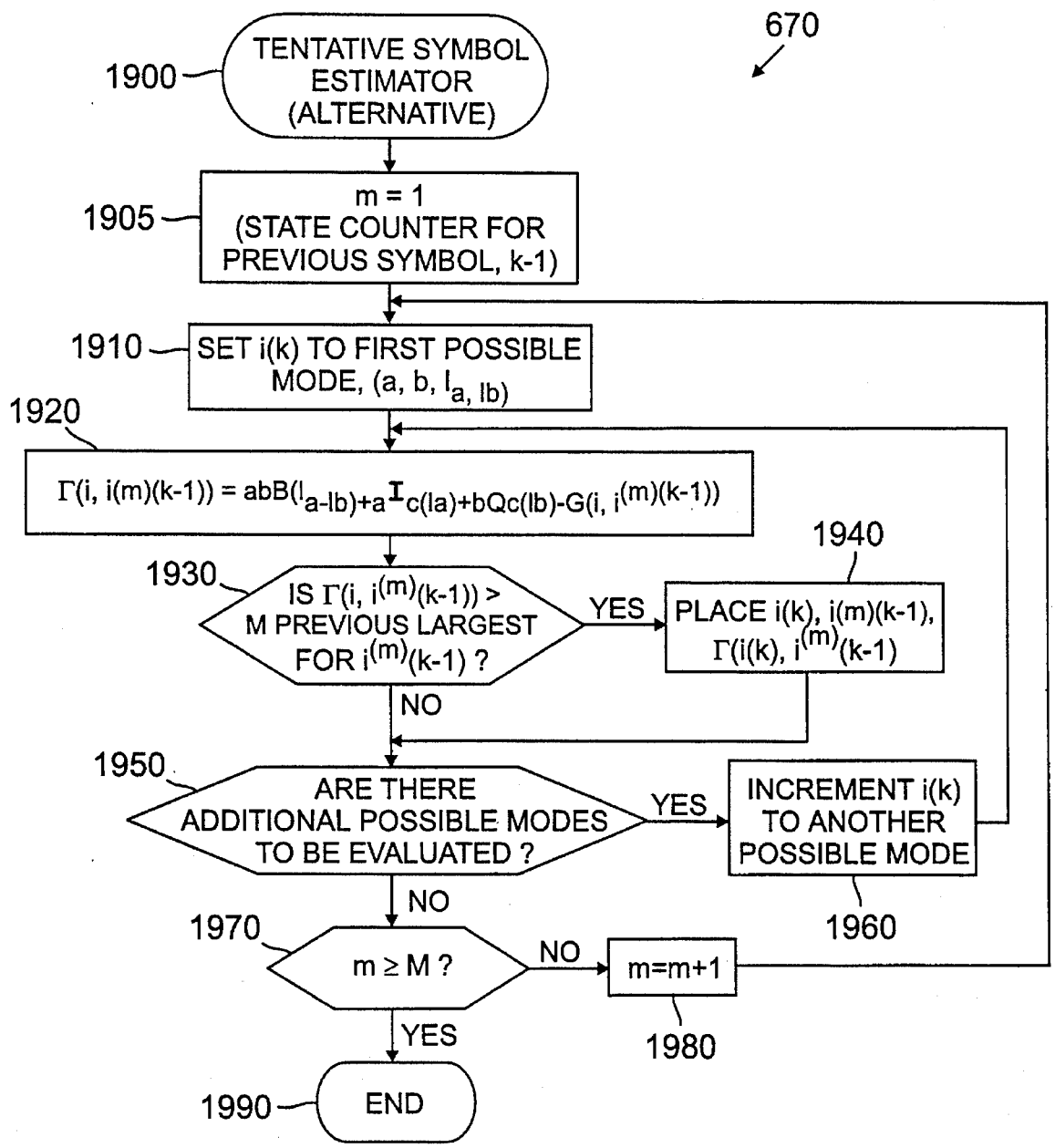
FIG. 19 is a flow chart describing an alternative implementation of the tentative symbol estimator of FIG. 6.

Details of the alternative implementation of the tentative symbol estimator 670, are shown in FIG. 19. For each intermediate state, which is associated with a particular estimate for the previous symbol, k–1, the alternative implementation of the tentative symbol estimator 670 will evaluate the likelihood of each of the 256 possible signal states, or modes, for the symbol, k, and assign a weight to each mode, taking into account ISI, assuming that the previous symbol had the value of the associated state. In order to compensate for the ISI, the path weight, $T(i^{(m)}(k))$, takes into account the influence, G, on the current symbol, i(k), that is attributable to the previous symbol, i(k–1).

As discussed below, the weight assigned to each mode for an intermediate state is based upon three factors, namely, the matched filter data values, $I_c$ and $Q_c$, measured for the respective symbol, k, the precomputed bias terms, $B(l_a - l_b)$, and the trellis correction terms, G. As previously indicated, the alternative tentative symbol estimator 670 will generate the set of intermediate states, such as the states 1840, 1845, 1850 and 1855. The alternative tentative symbol estimator 670 will be entered at step 1900.

Thereafter, a counter, m, will be initialized to a value of one during step 1905. The counter, m, will be utilized to step through each state, m, of the previous symbol, k–1. Thus, each value of m is thereby associated with a particular intermediate state, such as the state 1840. Each possible value of the symbol k will be evaluated during steps 1910 through 1960, to determine the likelihood that symbol k would have each value, given the state value, m, of the previous symbol, k–1.

The alternative tentative symbol estimator 670 will initially set i(k) to a first possible mode, or signal state, (a, b, $l_a$ and $l_b$), during step 1910. Thereafter, during step 1920, the alternative tentative symbol estimator 670 will evaluate the weight, $r(i, i^{(m)}(k-1))$, of the current mode, i(k), assuming the previous symbol, k–1, had the value indicated by state m, according to the following equation:

$$\Gamma(k(k), i^{(m)}(k-1)) = abB(l_a - l_b) + aI_c(l_a) + bQ_c(l_b) - G(i(k), i^{(m)}(k-1)).$$

The alternative tentative symbol estimator 670 will perform a test during step 1930 to determine if the weight, Γ, of the current mode, i(k), is one of the M previous largest for the value, $i^{(m)}(k-1)$, where M is the number of modes or states retained for each symbol estimate. It is noted that in the illustrative embodiment, M is equal to four. If it is determined during step 1930 that the weight, Γ, calculated during step 1920 is one of the M previous largest, then the current mode, i(k), of symbol k, the current mode, $i^{(m)}(k-1)$, of the previous symbol, k–1, and the associated weight, $\Gamma(i, i^{(m)}(k-1))$, of the current mode, i(k), are stored during step 1940. In this manner, the M modes having the highest weights will be retained for the current intermediate state, such as the state 1840.

A test is then performed during step 1950 to determine if there are additional possible modes or signal states, i(k), for the current symbol, k, to be evaluated. If it is determined during step 1950 that there are additional possible modes or signal states to be evaluated, i(k) will be incremented to another possible mode, (a, b, $l_a$, $l_b$), during step 1960. Thereafter, program control will return to step 1920 to process the remaining modes in the manner described above.

If, however, it is determined during step 1950 that there are no additional modes to be evaluated, a test will be performed during step 1970 to determine if the value of the counter, m, is greater than or equal to M, the number of retained states. In other words, whether each of the retained states of the previous symbol, k−1, have been evaluated.

If it is determined during step 1970 that m is not greater than or equal to M, then the value of m will be incremented during step 1980. Thereafter, program control will return to step 1910 to process the remaining states of the previous symbol, k−1, in the manner described above. If, however, it is determined during step 1970 that m is greater than or equal to M, then program control will terminate during step 1990.

Figure 20:
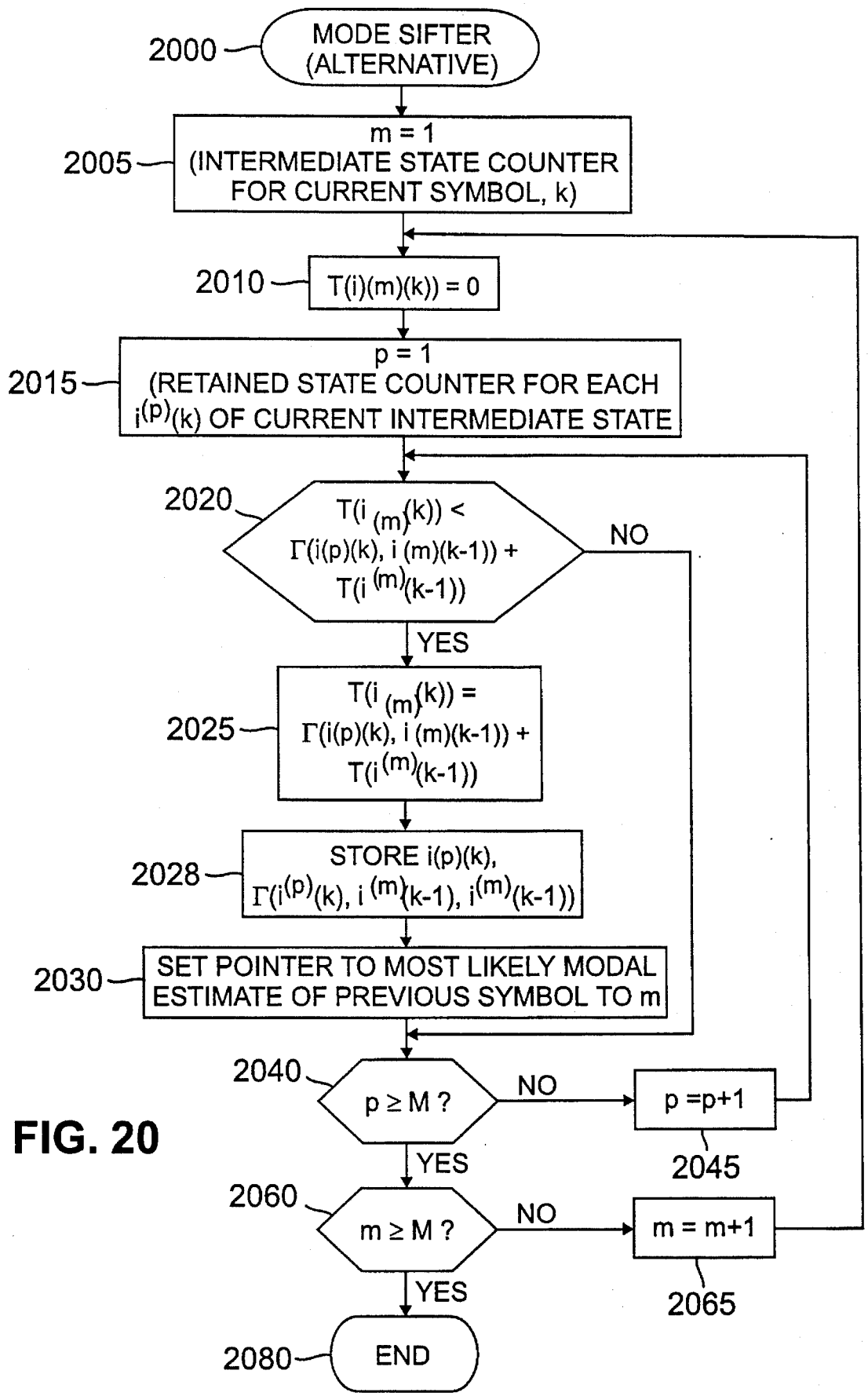
FIG. 20 is a flow chart describing an alternative implementation of the mode sifter of FIG. 6.

The alternative implementation of the mode sifter 680, illustrated in FIG. 20, will evaluate the weighted values for each intermediate symbol estimate, as determined by the alternative tentative symbol estimator 670 of FIG. 19, and assign final estimates to each symbol value. As discussed above, the alternative tentative symbol estimator 670 has already compensated for intersymbol interference by taking into account the calculated influence, G(i(k+1), i(k)), of adjacent symbols on one another. Thus, the alternative mode sifter 680 will identify final estimates by evaluating the accumulated path weights, T, as well as the weights, Γ, of the current state and symbol, as calculated by the alternative tentative symbol estimator 670.

As discussed below, a new path weight, $T(i^{(m)}(k))$, is calculated for each retained state, p, of each intermediate state, m, for a particular symbol, k. The new path weight, $T(i^{(m)}(k))$, quantifies the likelihood that a particular path through the trellis 1800 to that state identifies the proper estimate for each symbol along the path. The path weight, $T(i^{(m)}(k))$, for a particular state, m, of a symbol, k, is based upon the accumulated weight, $T(i^{(m)}(k-1))$, of the path up to and including the previous symbol, k−1, plus the weight, $\Gamma(i^{(p)}(k), i^{(m)}(k-1))$, of the current state and symbol.

As shown in FIG. 20, the alternative mode sifter 680 is entered at step 2000. Thereafter, a counter, m, is initialized to one. The counter, m, will be utilized to step through each intermediate state, such as the state 1840, for the current symbol, k. The accumulated path weight for the current intermediate state and symbol, $T(i^{(m)}(k))$, is then initialized to zero during step 2010.

A counter, p, is initialized to one during step 2015. The counter, p, is utilized to step through each of the retained states, $i^{(p)}(k)$, of the current intermediate state. The alternative mode sifter 680 will then select the path from the retained states in the current intermediate state, which yields the greatest weight for the current state, m, of symbol, k, during steps 2020 through 2045.

Specifically, a test is performed during step 2020 to determine if the current estimate of the accumulated path weight value, $T(i^{(m)}(k))$, currently stored for the current state, m, of symbol, k, is less than the accumulated weight of a path through the current state, p, of the intermediate state, to the current state, m, of symbol, k, which is defined by:

$$\Gamma(i^{(p)}(k), i^{(m)}(k-1)) + T(i^{(m)}(k-1)).$$

As indicated above, the first element of this equation, Γ, quantifies the weight of the current state and symbol, and the second element, T, quantifies the accumulated path weight of the path through state, p. It is noted that for the first received symbol, where k is equal to one, there are no previous symbols. Thus, the concept of an accumulated surviving path weight is not relevant. Accordingly, where k is equal to one, the input accumulated path weight, T, is zero.

If it is determined during step 2020 that the current estimate of the accumulated path weight value, $T(i^{(m)}(k))$, currently stored for the current state, m, of symbol, k, is less than the accumulated weight of a path through the current state, p, to the current state, m, of symbol, k, then the current estimate of the accumulated path weight value, $T(i^{(m)}(k))$, currently stored for the current state, m, of symbol, k, is replaced with the newly calculated accumulated path weight during step 2025. In addition, the value of the state, $i^{(p)}(k)$ and its associated weight, Γ, are stored during step 2028. Thereafter, an indication of the current value of m is stored as the current estimate of the pointer to the most likely modal estimate of the previous symbol during step 2030.

If, however, it is determined during step 2020 that the accumulated path weight value, $T(i^{(m)}(k))$, currently stored for the current state, m, of symbol, k, is greater than the accumulated weight of a path through the current state, p, then program control will proceed to step 2040. A test is performed during step 2040 to determine if the value of the counter, p, is greater than M, the number of retained states. In other words, whether there are additional retained states for the current intermediate state to be evaluated.

If it is determined during step 2040 that there are additional states to be evaluated, the value of the counter, p, is incremented during step 2045, and program control will return to step 2020 to process the remaining states in the manner described above. If, however, it is determined during step 2040 that there are no additional retained states for the current intermediate state to be evaluated, then program control will proceed to step 2060.

In this manner, following execution of steps 2020 through 2045, the accumulated path weight value, $T(i^{(m)}(k))$, stored for the current state, m, of symbol, k, will be for the path through the previous symbol, k−1, to the current state and symbol which provides the maximum path weight.

A test is performed during step 2060 to determine if the value of the counter, m, is greater than M, the number of retained states. In other words, whether there are additional intermediate states from the current symbol to be evaluated. If it is determined during step 2060 that there are additional intermediate states from the current symbol to be evaluated, the value of the counter, m, is incremented during step 2065, and program control will return to step 2010 to process the remaining states in the manner described above.

If, however, it is determined during step 2060 that there are no additional intermediate states from the current symbol to be evaluated, then program execution will terminate during step 2080.

In certain communication environments, the communication channel may primarily exhibit only interchip or intersymbol interference. Although the preferred embodiment has been discussed with respect to an implementation which compensates for both interchip and intersymbol interference, the embodiments and variations shown and described herein may be extended to communication environments exhibiting only interchip or intersymbol interference, as would be apparent to one of ordinary skill in the art, based on the disclosure presented herein.

It is to be understood that the embodiments and variations shown and described herein are illustrative of the principles of this invention only and that various modifications may be implemented by those skilled in the art without departing from the scope and spirit of the invention.

We claim:

1. An apparatus for receiving a received signal comprising information symbols transmitted across a communication channel, each of said symbols conveying a plurality of bits transmitted during a given symbol duration, each of said symbols being encoded using a first and a second spread spectrum code pulse position modulated signal transmitted during said associated symbol duration to a generate a spread spectrum codeword, said communication channel exhibiting delay spread characteristics, said delay spread causing residual coupling between said first and second spread spectrum code pulse position modulated signals of a given symbol duration and causing energy associated with a first symbol transmitted during a first symbol duration to disperse into one or more adjacent symbol durations, said receiver apparatus comprising:

a filter matched to said spread spectrum codewords;

a channel matched filter matched to said delay spread characteristics of said communication channel;

a tentative symbol estimator for sampling output signals of said channel matched filter to estimate the value of each symbol, said estimation assigning a weight to each possible value of said symbol, each of said weights taking into account said residual coupling influence between said first and second spread spectrum code pulse position modulated signals; and a mode sifter for evaluating said weights assigned by said tentative symbol estimator to select a final estimate for said symbol value, said final estimate selection taking into account the influence of said one or more adjacent transmitted symbols on one another.

2. The receiver apparatus of claim 1, wherein each of said spread spectrum codewords comprises an orthogonal pulse position modulated signal.

3. The receiver apparatus of claim 1, wherein said communication channel is a wireless radio channel.

4. The receiver apparatus of claim 1, wherein said first and second spread spectrum code pulse position modulated signals are each modulated by a carrier signal having a distinct phase, amplitude or frequency.

5. The receiver apparatus of claim 1, wherein said symbols are defined by the polarity and position of the main lobe of said first and second spread spectrum code pulse position modulated signals upon said matched filtering.

6. The receiver apparatus of claim 1, wherein said mode sifter evaluates a reduced number of said weights assigned by said tentative symbol estimator to assign said final estimates.

7. The receiver apparatus of claim 1, wherein said mode sifter waits for a predefined window period before making a determination about said final estimate of a symbol.

8. The receiver apparatus of claim 1, wherein said filter matched to said delay spread characteristics of said channel compensates for the phase shifts and loss of energy of the received signal caused by said communication channel.

9. The receiver apparatus of claim 1, further comprising a channel parameter estimator for analyzing one or more training symbols transmitted through said communication channel, said channel parameter estimator generating an estimate of the impulse response of said channel for utilization by said filter matched to said channel characteristics.

10. The receiver apparatus of claim 1, further comprising a channel parameter estimator for analyzing one or more training symbols transmitted through said communication channel, said channel parameter estimator generating a series of bias correction terms utilized by said tentative symbol estimator to compensate for said residual coupling.

11. The receiver apparatus of claim 1, further comprising a channel parameter estimator for analyzing one or more training symbols transmitted through said communication channel, said channel parameter estimator generating a series of trellis correction terms utilized by said mode sifter to compensate for said dispersion of said energy of a first symbol into one or more adjacent symbol durations.

12. An apparatus for receiving an information symbol transmitted across a communication channel, said symbol conveying a plurality of bits transmitted during a symbol duration, said symbol being encoded using a first and a second spread spectrum code pulse position modulated signal transmitted during said associated symbol duration to generate a spread spectrum codeword, said communication channel exhibiting delay spread characteristics, said delay spread causing residual coupling between said first and second spread spectrum code pulse position modulated signals, said receiver apparatus comprising:

a filter matched to said spread spectrum codeword;

a channel matched filter matched to said delay spread characteristics of said communication channel;

a tentative symbol estimator for sampling output signals of said channel matched filter to estimate the value of said symbol, said estimation assigning a weight to each possible value of said symbol, each of said weights taking into account said residual coupling influence between said first and second spread spectrum code pulse position modulated signals on one another; and;

a mode sifter for evaluating said weights assigned by said tentative symbol estimator to select a final estimate for said symbol value, said final estimate being said possible value of said symbol having the greatest weight.

13. The receiver apparatus of claim 12, wherein said symbols are defined by the polarity and position of the main lobe of said first and second spread spectrum code pulse position modulated signals upon said matched filtering.

14. The receiver apparatus of claim 12, wherein said mode sifter evaluates a reduced number of said weights assigned by said tentative symbol estimator to assign said final estimates.

15. The receiver apparatus of claim 12, wherein said mode sifter waits for a predefined window period before making a determination about said final estimate of a symbol.

16. The receiver apparatus of claim 12, further comprising a channel parameter estimator for analyzing one or more training symbols transmitted through said communication channel, said channel parameter estimator generating an estimate of the impulse response of said channel for utilization by said filter matched to said channel characteristics.

17. The receiver apparatus of claim 12, further comprising a channel parameter estimator for analyzing one or more training symbols transmitted through said communication channel, said channel parameter estimator generating a series of bias correction terms utilized by said tentative symbol estimator to compensate for said residual coupling.

18. An apparatus for receiving information symbols transmitted across a communication channel, each of said symbols conveying a plurality of bits transmitted during a given symbol duration, each of said symbols being encoded using a spread spectrum code pulse position modulated signal to generate a spread spectrum codeword, said communication channel exhibiting delay spread characteristics, said delay spread causing energy associated with a first symbol transmitted during a first symbol duration to disperse into one or more adjacent symbol durations, said receiver apparatus comprising:

a filter matched to said spread spectrum codewords;

a channel matched filter matched to said delay spread characteristics of said communication channel;

a tentative symbol estimator for sampling output signals of said channel matched filter for a given symbol duration to estimate the value of each of said transmitted symbols, said estimation assigning a weight to each possible value of said symbol based on said sampled values; and a mode sifter for evaluating said weights assigned by said tentative symbol estimator to select a final estimate for said symbol value, said final estimate selection taking into account the influence of said one or more adjacent transmitted symbols on one another.

19. The receiver apparatus of claim 18, wherein said mode sifter evaluates a reduced number of said weights assigned by said tentative symbol estimator to assign said final estimates.

20. The receiver apparatus of claim 18, wherein said mode sifter waits for a predefined window period before making a determination about said final estimate of a symbol.

21. The receiver apparatus of claim 18, further comprising a channel parameter estimator for analyzing one or more training symbols transmitted through said communication channel, said channel parameter estimator generating an estimate of the impulse response of said channel for utilization by said filter matched to said channel characteristics.

22. The receiver apparatus of claim 18, further comprising a channel parameter estimator for analyzing one or more training symbols transmitted through said communication channel, said channel parameter estimator generating a series of trellis correction terms utilized by said mode sifter to compensate for said dispersion of said energy of a first symbol into one or more adjacent symbol durations.

23. An apparatus for receiving information symbols transmitted across a communication channel, each of said symbols conveying a plurality of bits transmitted during a given symbol duration, each of said symbols being encoded using a first and a second spread spectrum code pulse position modulated signal transmitted during said associated symbol duration to generate a spread spectrum codeword, said communication channel exhibiting delay spread characteristics, said delay spread causing residual coupling between said first and second spread spectrum code pulse potion modulated signals of a given symbol duration and causing energy associated with a first symbol transmitted during a first symbol duration to disperse into one or more adjacent symbol durations, said receiver apparatus comprising:

a filter matched to said spread spectrum codewords;

a channel matched filter matched to said delay spread characteristics of said communication channel;

a tentative symbol estimator for sampling output signals of said channel matched filter to estimate the value of said symbol, said estimation assigning a weight to each possible value of said symbol, each of said weights taking into account said residual coupling influence between said first and second spread spectrum code pulse position modulated signals of a given symbol duration on one another and said influence of said one or more adjacent transmitted symbols on one another; and a mode sifter for evaluating said weights assigned by said tentative symbol estimator to select a final estimate for each of said symbol values, said final estimate being said possible value of said symbol having the greatest weight.

24. A method for receiving a received signal comprising information symbols transmitted across a communication channel, each of said symbols conveying a plurality of bits transmitted during a given symbol duration, each of said symbols being encoded using a first and a second spread spectrum code pulse position modulated signal transmitted during said associated symbol duration to generate a spread spectrum codeword, said communication channel exhibiting delay spread characteristics, said delay spread causing residual coupling between said first and second spread spectrum code pulse position modulated signals of a given symbol duration and causing energy associated with a first symbol transmitted during a first symbol duration to disperse into one or more adjacent symbol durations, said receiving method comprising the steps of:

filtering said received signal with a filter matched to said spread spectrum codewords;

filtering said received signal with a channel matched filter matched to said delay spread characteristics of said communication channel;

sampling output signals of said channel matched filter to estimate the value of each symbol, and assigning a weight to each possible value of said symbol, each of said weights taking into account said residual coupling influence between said first and second spread spectrum code pulse position modulated signals; and evaluating said weights to select a final estimate for said symbol value, said final estimate selection taking into account the influence of said one or more adjacent transmitted symbols on one another.

25. A method for receiving a received signal comprising an information symbol transmitted across a communication channel, said symbol conveying a plurality of bits transmitted during a symbol duration, said symbol being encoded using a first and a second spread spectrum code pulse position modulated signal transmitted during said associated symbol duration to generate a spread spectrum codeword, said communication channel exhibiting delay spread characteristics, said delay spread causing residual coupling between said first and second spread spectrum code pulse position modulated signals, said receiving method comprising the steps of:

filtering said received signal with a filter matched to said spread spectrum codeword;

filtering said signal with a channel matched filter matched to said delay spread characteristics of said communication channel;

sampling output signals of said channel matched filter to estimate the value of said symbol, and assigning a weight to each possible value of said symbol, each of said weights taking into account said residual coupling influence between said first and second spread spectrum code pulse position modulated signals on one another; and evaluating said weights to select a final estimate for said symbol value, said final estimate being said possible value of said symbol having the greatest weight.

26. A method for receiving a received signal comprising information symbols transmitted across a communication channel, each of said symbols conveying a plurality of bits transmitted during a given symbol duration, each of said symbols being encoded using a spread spectrum code pulse position modulated signal to generate a spread spectrum codeword, said communication channel exhibiting delay spread characteristics, said delay spread causing energy associated with a first symbol transmitted during a first symbol duration to disperse into one or more adjacent symbol durations, said receiving method comprising the steps of:

filtering said received signal with a filter matched to said spread spectrum codewords;

filtering said received signal with a channel matched filter matched to said delay spread characteristics of said communication channel;

sampling output signals of said channel matched filter for a given symbol duration to estimate the value of each of said transmitted symbols, and assigning a weight to each possible value of said symbol based on said sampled values; and evaluating said weights to select a final estimate for said symbol value, said final estimate selection taking into account the influence of said one or more adjacent transmitted symbols on one another.

27. A method for receiving a received signal comprising information symbols transmitted across a communication channel, each of said symbols conveying a plurality of bits transmitted during a given symbol duration, each of said symbols being encoded using a first and a second spread spectrum code pulse position modulated signal transmitted during said associated symbol duration to generate a spread spectrum codeword, said communication channel exhibiting delay spread characteristics, said delay spread causing residual coupling between said first and second spread spectrum code pulse position modulated signals of a given symbol duration and causing energy associated with a first symbol transmitted during a first symbol duration to disperse into one or more adjacent symbol durations, said receiving method comprising the steps of:

filtering said received signal with a filter matched to said spread spectrum codewords;

filtering said received signal with a channel matched filter matched to said delay spread characteristics of said communication channel;

sampling output signals of said channel matched filter to estimate the value of said symbol, and assigning a weight to each possible value of said symbol, each of said weights taking into account said residual coupling influence between said first and second spread spectrum code pulse position modulated signals of a given symbol duration on one another and said influence of said one or more adjacent transmitted symbols on one another; and evaluating said weights to select a final estimate for each of said symbol values, said final estimate being said possible value of said symbol having the greatest weight.

* * * * *